US012228933B2

(12) United States Patent
Udagawa et al.

(10) Patent No.: US 12,228,933 B2
(45) Date of Patent: Feb. 18, 2025

(54) AUTONOMOUS WORK MACHINE, CONTROL DEVICE, AUTONOMOUS WORK MACHINE CONTROL METHOD, CONTROL DEVICE OPERATION METHOD, AND STORAGE MEDIUM

(71) Applicant: HONDA MOTOR CO., LTD., Tokyo (JP)

(72) Inventors: Takamasa Udagawa, Wako (JP); Makoto Yamamura, Wako (JP); Hiroto Takahashi, Wako (JP); Masaya Honji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 358 days.

(21) Appl. No.: 17/575,606

(22) Filed: Jan. 13, 2022

(65) Prior Publication Data
US 2022/0137631 A1 May 5, 2022

Related U.S. Application Data

(63) Continuation of application No. PCT/JP2019/028901, filed on Jul. 23, 2019.

(51) Int. Cl.
*G05D 1/00* (2024.01)
*G05D 1/229* (2024.01)
(Continued)

(52) U.S. Cl.
CPC ......... *G05D 1/0214* (2013.01); *G05D 1/0234* (2013.01); *G05D 1/0246* (2013.01);
(Continued)

(58) Field of Classification Search
CPC .. G05D 1/0214; G05D 1/0234; G05D 1/0246; G05D 1/2295; G05D 1/0253;
(Continued)

(56) References Cited

U.S. PATENT DOCUMENTS 8,239,084 B2 8/2012 Yamamoto et al.
8,385,600 B2 2/2013 Nara et al.
(Continued)

FOREIGN PATENT DOCUMENTS

CN 107924617 A 4/2018
EP 3168705 A1 5/2017
(Continued)

OTHER PUBLICATIONS

Japanese Office Action for Japanese Patent Application No. 2021-534462 mailed Jul. 18, 2023 (partially translated).
(Continued)

*Primary Examiner* — Ryan Rink
(74) *Attorney, Agent, or Firm* — Thomas | Horstemeyer, LLP

(57) ABSTRACT

An autonomous work machine that works in a work area, the autonomous work machine comprising: a storage unit that stores past captured images including one or more markers arranged to define the work area; a specifying unit that specifies a past captured image stored in the storage unit and similar to a current captured image captured by an image capturing unit; and a control unit that controls the autonomous work machine based on the past captured image specified by the specifying unit.

12 Claims, 27 Drawing Sheets

(51) Int. Cl.
*G06T 1/00* (2006.01)
*G06T 7/70* (2017.01)

(52) U.S. Cl.
CPC ......... *G05D 1/2295* (2024.01); *G06T 1/0007* (2013.01); *G06T 7/70* (2017.01); *G06T 2207/30204* (2013.01)

(58) Field of Classification Search
CPC ....... G05D 1/0274; G06T 1/0007; G06T 7/70; G06T 2207/30204; A01D 34/008; G06V 20/10; G06V 20/56; G06V 20/588; G06V 20/64
See application file for complete search history.

(56) References Cited

U.S. PATENT DOCUMENTS

| | | |
|---|---|---|
| 9,497,901 B2 | 11/2016 | Willgert |
| 9,603,300 B2 | 3/2017 | Pettersson |
| 10,054,952 B2 | 8/2018 | Shiromizu et al. |
| 10,222,797 B2 | 3/2019 | Yamamura et al. |
| 10,315,306 B2 | 6/2019 | Abramson |
| 10,872,246 B2 | 12/2020 | Sattar et al. |
| 11,164,455 B2 | 11/2021 | Oba |
| 2009/0028387 A1 | 1/2009 | Jeong et al. |
| 2010/0235033 A1 | 9/2010 | Yamamoto et al. |
| 2010/0246889 A1 | 9/2010 | Nara et al. |
| 2014/0214237 A1* | 7/2014 | Kini ................ E02F 9/2054 701/2 |
| 2015/0163993 A1 | 6/2015 | Pettersson |
| 2015/0201555 A1 | 7/2015 | Willgert |
| 2016/0282866 A1 | 9/2016 | Yamamura et al. |
| 2017/0113342 A1 | 4/2017 | Abramson |
| 2017/0262734 A1* | 9/2017 | Nakata ................ B60W 30/09 |
| 2017/0269603 A1 | 9/2017 | Shiromizu et al. |
| 2017/0364088 A1* | 12/2017 | Grufman ............. G05D 1/0246 |
| 2018/0151066 A1 | 5/2018 | Oba |
| 2019/0073542 A1 | 3/2019 | Sattar et al. |
| 2019/0098468 A1* | 3/2019 | Yamamoto ............ G01C 21/26 |
| 2019/0275666 A1 | 9/2019 | Abramson |
| 2020/0121888 A1 | 4/2020 | Haneda et al. |
| 2021/0027489 A1* | 1/2021 | Shimamura ......... G05D 1/0088 |
| 2021/0407290 A1 | 12/2021 | Oba |

FOREIGN PATENT DOCUMENTS

| | | |
|---|---|---|
| EP | 3223102 A1 | 9/2017 |
| JP | H03-071313 A | 3/1991 |
| JP | 2007-094743 A | 4/2007 |
| JP | 2007-213293 A | 8/2007 |
| JP | 2008-065755 A | 3/2008 |
| JP | 2009-184059 A | 8/2009 |
| JP | 2010-221859 A | 10/2010 |
| JP | 2016-186748 A | 10/2016 |
| JP | 2017-091246 A | 5/2017 |
| JP | 2017-107456 A | 6/2017 |
| JP | 2017-158532 A | 9/2017 |
| JP | 2019-004792 A | 1/2019 |
| WO | 2018/123598 A1 | 7/2018 |
| WO | 2019/009164 A1 | 1/2019 |
| WO | 2019/124225 A1 | 6/2019 |
| WO | 2021/014585 A1 | 1/2021 |

OTHER PUBLICATIONS

Japanese Office Action for Japanese Patent Application No. 2021534462 mailed Dec. 1, 2023.
Extended European Search Report for European Patent Application No. 19938129.4 mailed Oct. 13, 2022.
International Search Report and Written Opinion for PCT/JP2019/028901 mailed Oct. 15, 2019.

* cited by examiner

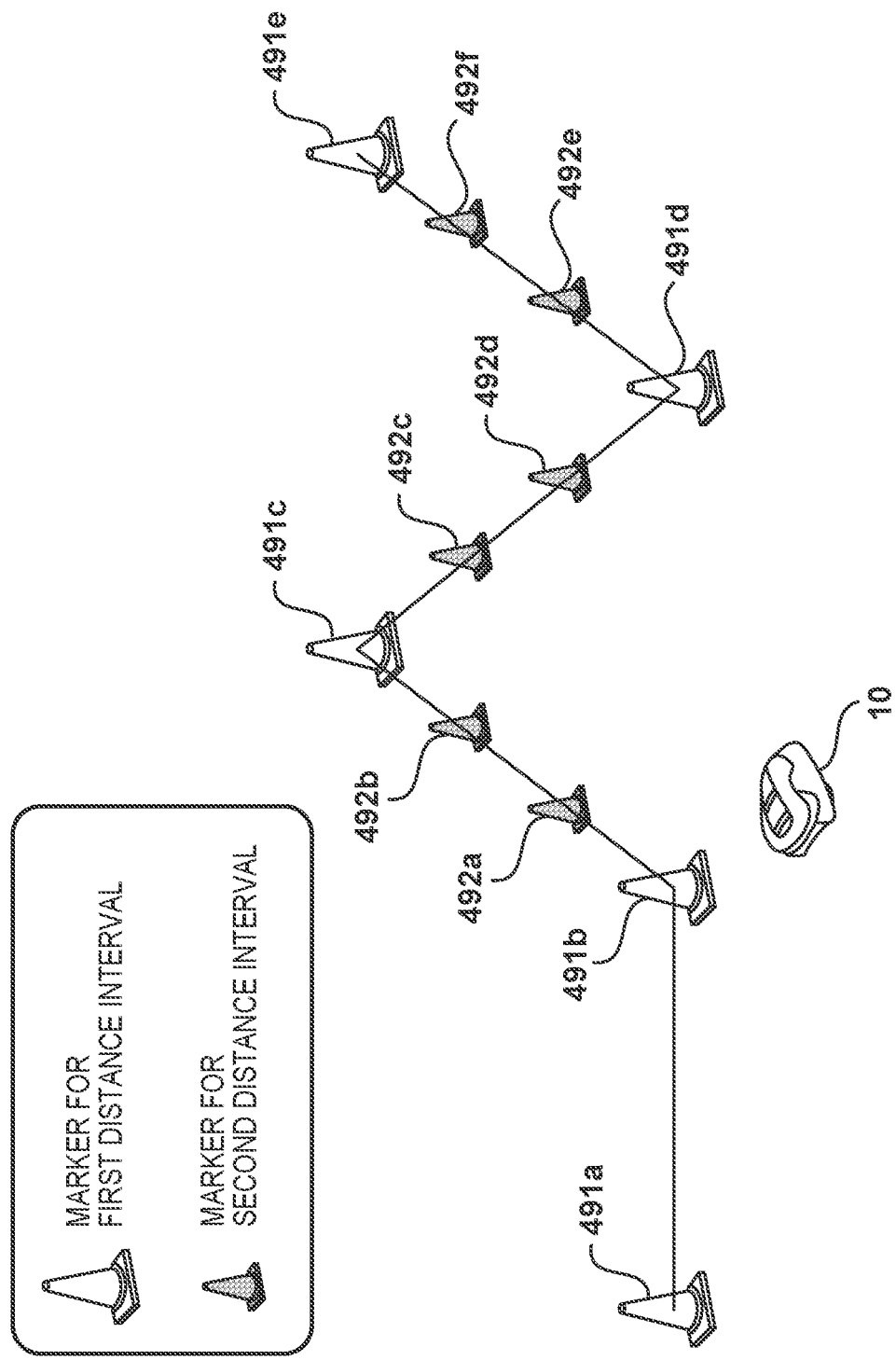

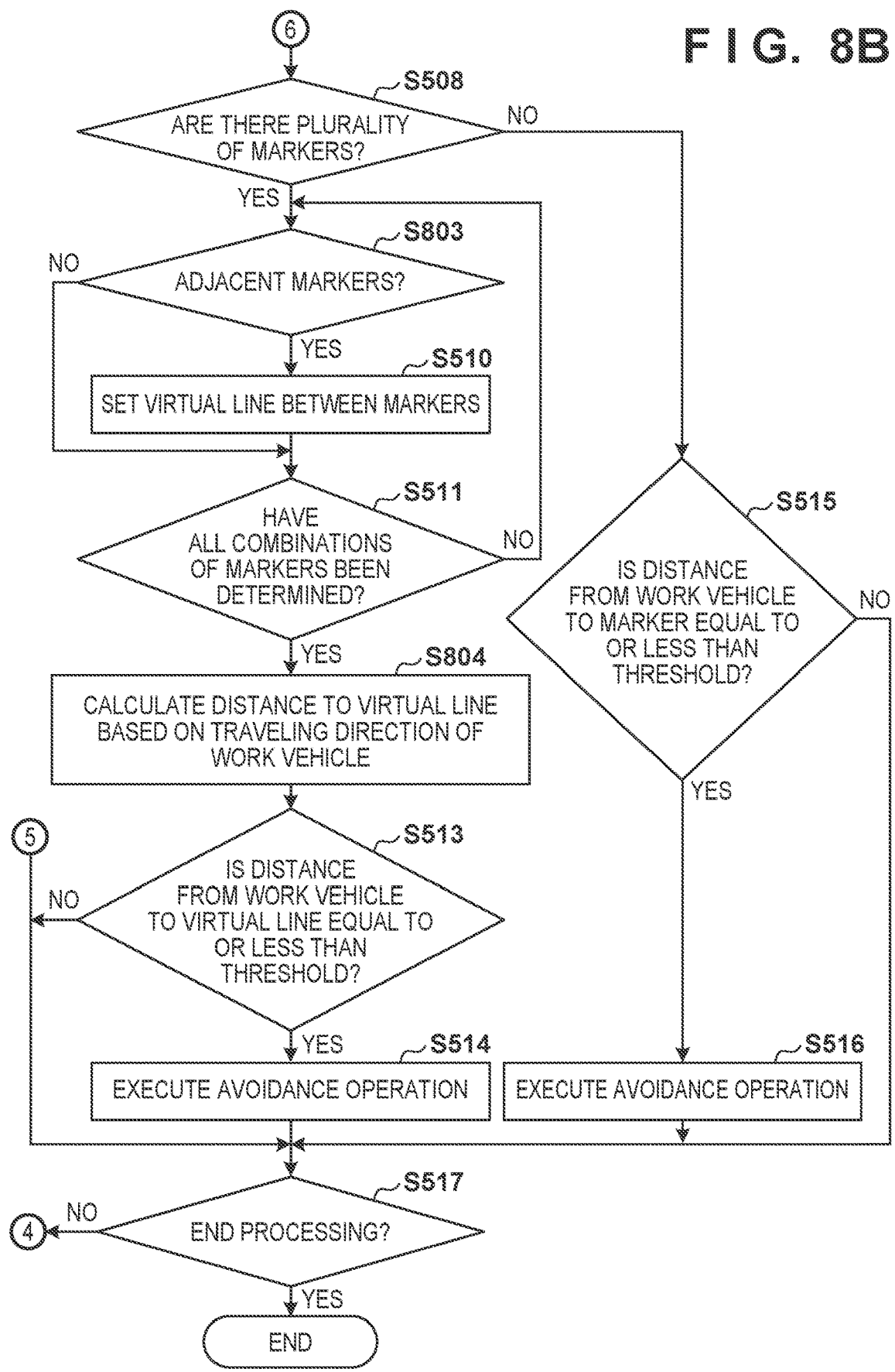

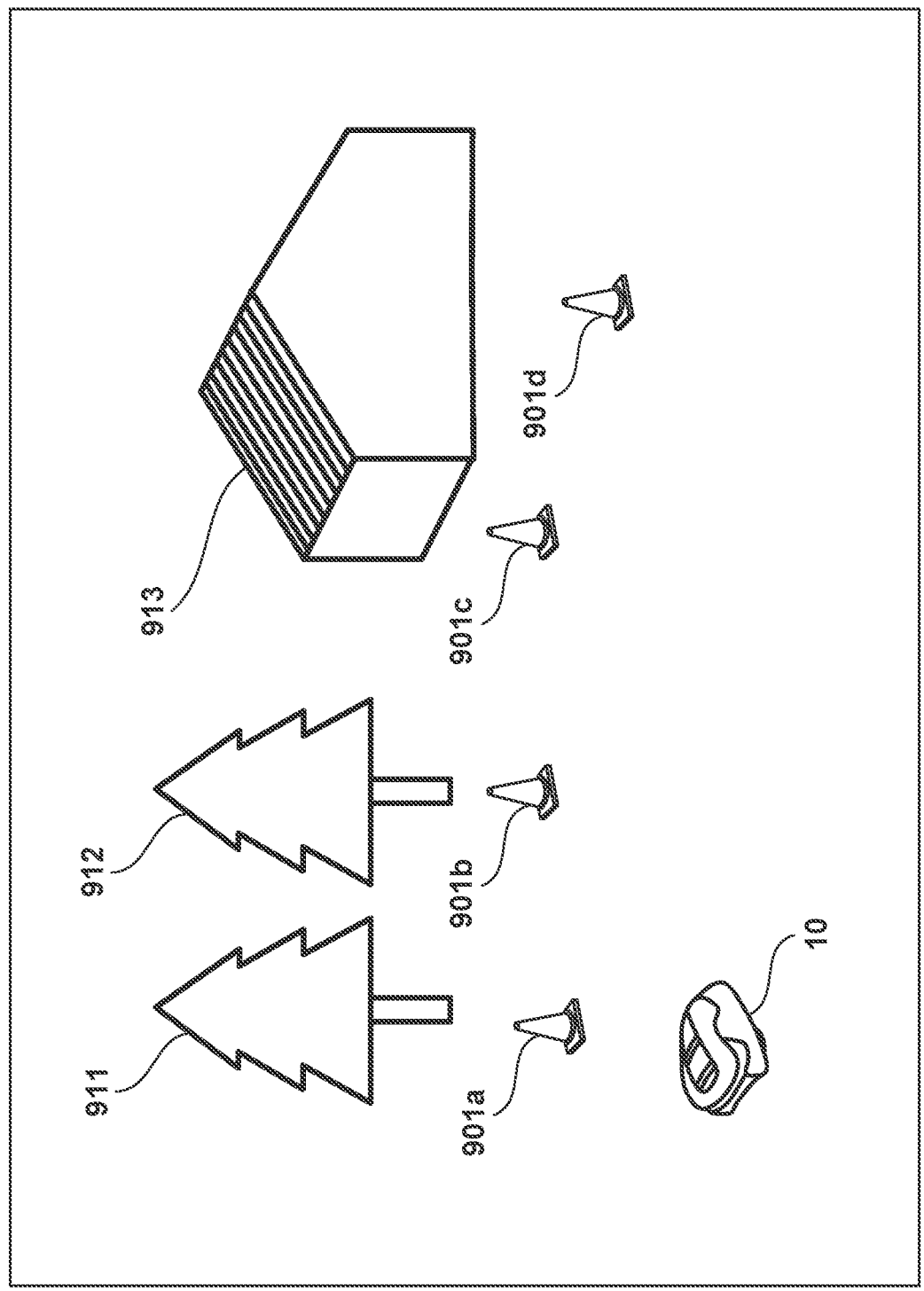

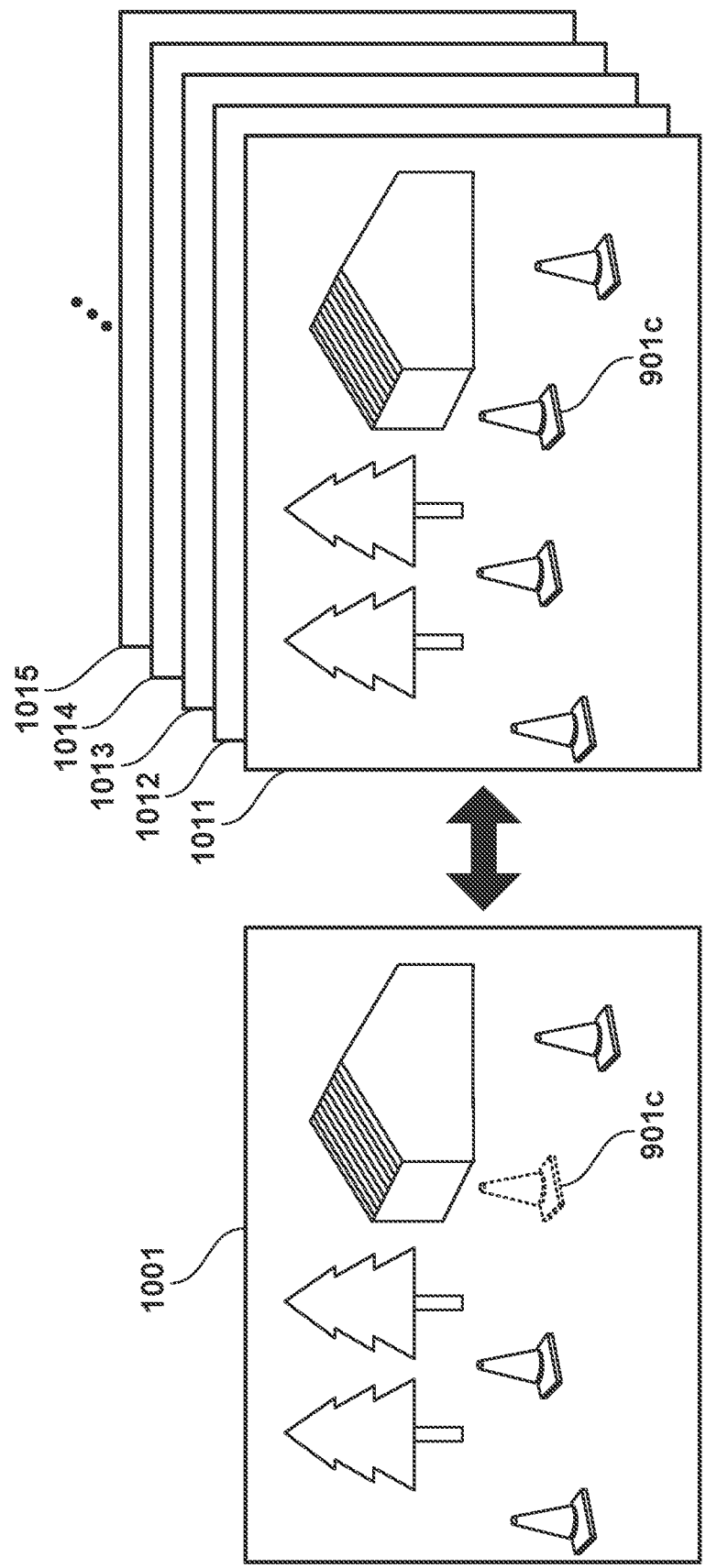

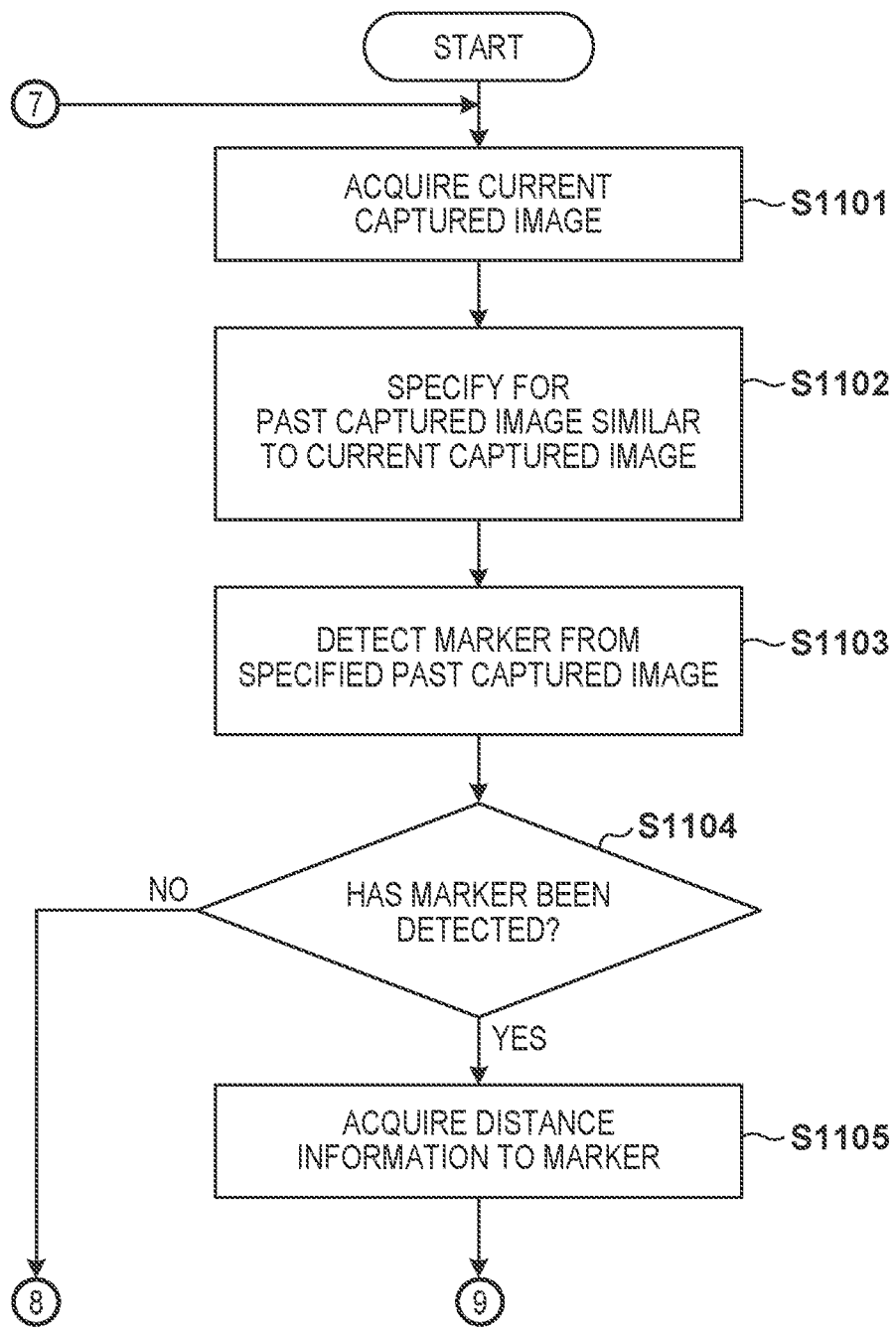

AUTONOMOUS WORK MACHINE, CONTROL DEVICE, AUTONOMOUS WORK MACHINE CONTROL METHOD, CONTROL DEVICE OPERATION METHOD, AND STORAGE MEDIUM

CROSS-REFERENCE TO RELATED APPLICATION(S)

This application is a continuation of International Patent Application No. PCT/JP2019/028901 filed on Jul. 23, 2019, the entire disclosure of which is incorporated herein by reference.

BACKGROUND OF THE INVENTION

Field of the Invention

The present invention relates to an autonomous work machine, a control device, an autonomous work machine control method, a control device operation method, and a storage medium.

Description of the Related Art

PTL 1 discloses that when a marker is recognized, position information of the marker stored in a robot vehicle is read to grasp a current position of the robot vehicle.

CITATION LIST

Patent Literature

PTL 1: U.S. Pat. No. 9,497,901

However, the technique described in PTL 1 has a problem that it is difficult to continue the work when some or all of markers arranged to define a work area are lost.

The present invention has been made in view of the above problem, and the present invention provides a technique for continuing work even when some or all of markers arranged to define a work area are lost.

SUMMARY OF THE INVENTION

According to one aspect of the present invention, there is provided an autonomous work machine that works in a work area and including a storage unit that stores past captured images including one or more markers arranged to define the work area, a specifying unit that specifies a past captured image stored in the storage unit and similar to a current captured image captured by an image capturing unit, and a control unit that controls the autonomous work machine based on the past captured image specified by the specifying unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4G is an explanatory diagram of a method for determining adjacent markers according to an embodiment of the present invention.

FIG. 8B is a flowchart illustrating a procedure of processing performed by the autonomous work machine according to the second embodiment.

FIG. 9 is a diagram illustrating a travel example of an autonomous work machine according to a third embodiment.

FIG. 10 is a diagram illustrating a search example of a past captured image similar to a current captured image of the autonomous work machine according to the third embodiment.

FIG. 11A is a flowchart illustrating a procedure of processing performed by an autonomous work machine according to a third embodiment.

DESCRIPTION OF THE EMBODIMENTS

Figure 1:
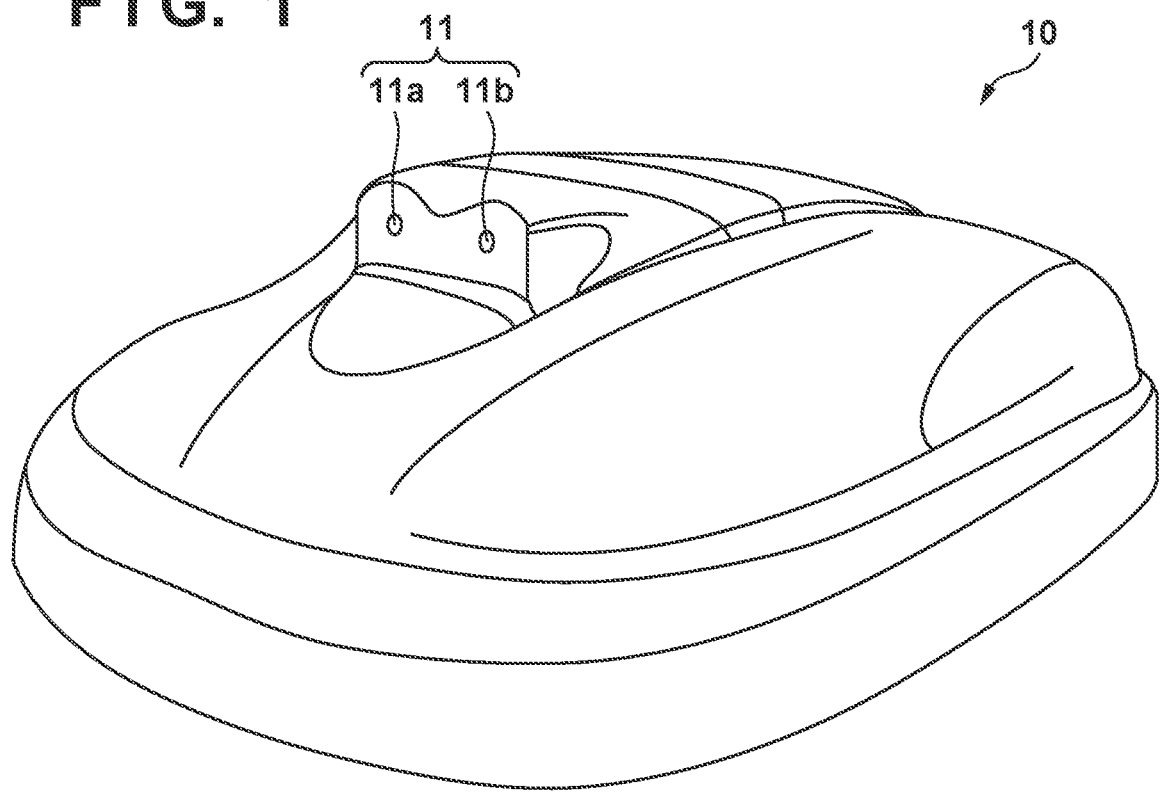
FIG. 1 is an external view of a work machine capable of autonomously traveling according to an embodiment of the present invention.

Hereinafter, embodiments of the present invention will be described with reference to the accompanying drawings. Note that the same components are denoted by the same reference numerals throughout the drawings.

First Embodiment

FIG. 1 is an external view of an autonomous work machine capable of autonomously traveling according to an embodiment of the present invention. Hereinafter, a moving direction (vehicle length direction), a lateral direction (vehicle width direction) orthogonal to the moving direction, and a vertical direction orthogonal to the moving direction and the lateral direction in a side view of the autonomous work machine are respectively defined as a front-and-rear direction, a left-and-right direction, and an up-and-down direction, and the configuration of each part will be described in accordance with the above definition.

<Configuration of Autonomous Work Machine>

In FIG. 1, reference numeral 10 denotes an autonomous work machine (hereinafter referred to as a "work vehicle"). Specifically, the work vehicle 10 functions as a lawn mower that autonomously travels. However, the lawn mower is merely an example, and the present invention is also applicable to other types of work machines. The work vehicle 10 includes a camera unit (imaging unit) 11 including a plurality of cameras (a first camera 11a and a second camera 11b), and calculates and acquires distance information between an object existing forward and the work vehicle 10 using images captured by the first camera 11a and the second camera 11b having parallax. Then, the operation of the work vehicle 10 is controlled based on the captured image and the object recognition model held in advance.

Figure 2:
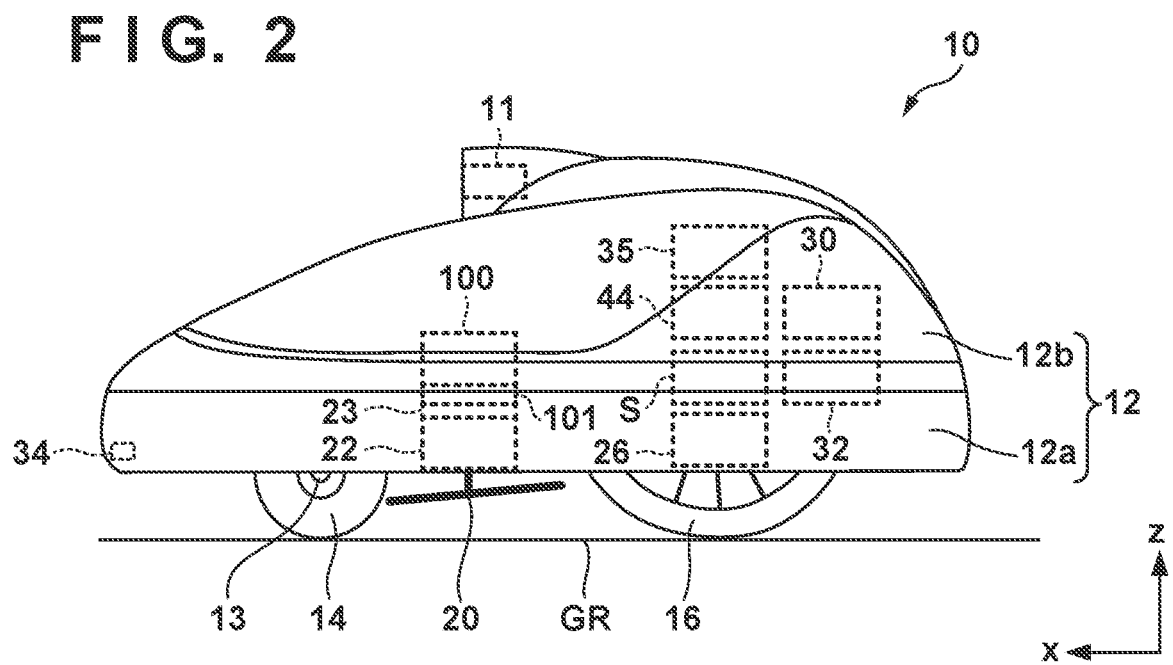
FIG. 2 is a diagram illustrating the work machine according to an embodiment of the present invention as viewed from the side.

FIG. 2 is a diagram illustrating the work vehicle 10 observed in the lateral direction (vehicle width direction). As illustrated in FIG. 2, the work vehicle 10 includes the camera unit 11, a vehicle body 12, a stay 13, front wheels 14, rear wheels 16, a blade 20, a work motor 22, a motor holding member 23, a blade-height adjustment motor 100, and a translation mechanism 101. The work vehicle 10 further includes a travel motor 26, a group of various sensors S, an electronic control unit (ECU) 44, a charging unit 30, a battery 32, a charging terminal 34, and a communication unit 35.

The vehicle body 12 of the work vehicle 10 includes a chassis 12a, and a frame 12b attached to the chassis 12a. The front wheels 14 include one left wheel and one right wheel each having a smaller diameter and fixed to the front of the chassis 12a through the stay 13 in the front-and-rear direction. The rear wheels 16 include one left wheel and one right wheel each having a larger diameter and attached to the rear of the chassis 12a.

The blade 20 is a rotary blade for a lawn mowing work, and is attached near the central position of the chassis 12a. The work motor 22 is an electric motor disposed above the blade 20. The blade 20 is connected with the work motor 22, and is rotatably driven by the work motor 22. The motor holding member 23 holds the work motor 22. The motor holding member 23 is restricted in rotation with respect to the chassis 12a, and is allowed to move in the up-and-down direction by, for example, the combination of a guide rail and a slider movable up and down while being guided by the guide rail.

The blade-height adjustment motor 100 is a motor for adjusting the height in the up-and-down direction of the blade 20 to the ground surface GR. The translation mechanism 101 is connected to the blade-height adjustment motor 100, and is a mechanism for converting rotation of the blade-height adjustment motor 100 into translation in the up-and-down direction. The translation mechanism 101 is also connected with the motor holding member 23 that holds the work motor 22.

The rotation of the blade-height adjustment motor 100 is converted into the translation (movement in the up-and-down direction) by the translation mechanism 101, and the translation is transmitted to the motor holding member 23. Due to the translation (movement in the up-and-down direction) of the motor holding member 23, the work motor 22 held by the motor holding member 23 also is translated (moves in the up-and-down direction). Due to the movement in the up-and-down direction of the work motor 22, the height of the blade 20 with respect to the ground surface GR is adjustable.

The travel motor 26 is two electric motors (prime movers) attached to the chassis 12a of the work vehicle 10. The two electric motors are connected one-to-one to the left and right rear wheels 16. By independently rotating the left and right wheels forward (rotating in the forward direction) or backward (rotating in the backward direction) with the front wheels 14 as driven wheels and the rear wheels 16 as driving wheels, the work vehicle 10 can be moved in various directions.

The charging terminal 34 is a charging terminal provided at a front end position in the front-and-rear direction of the frame 12b, and is connected with a corresponding terminal of a charging station (for example, a charging station 300 that will be described later with reference to FIG. 3) to receive electric power supplied from the charging station. The charging terminal 34 is connected with the charging unit 30 through wiring, and the charging unit 30 is connected with the battery 32. In addition, the work motor 22, the travel motor 26, and the blade-height adjustment motor 100 are connected to the battery 32, and are supplied with power from the battery 32.

An ECU 44 is an electronic control unit including a microcomputer formed on a circuit board and controls the operation of the work vehicle 10. The details of the ECU 44 will be described later. The communication unit 35 can transmit and receive information to and from an external device (for example, a charging station that will be described later, a communication terminal possessed by a user, a remote controller for operating the work vehicle 10, or the like) connected with the work vehicle 10 in a wired or wireless manner.

Figure 3:
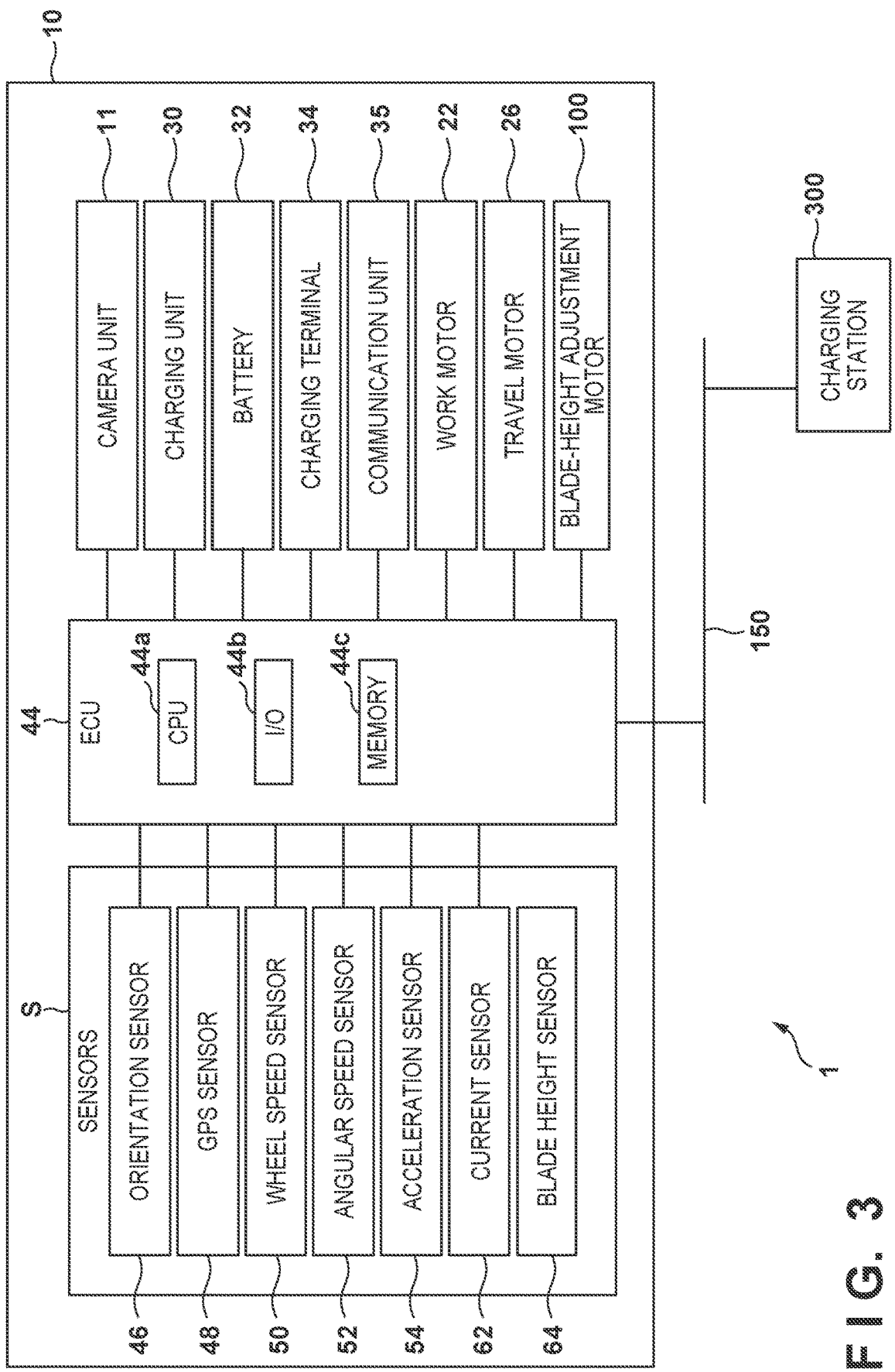
FIG. 3 is a diagram illustrating a configuration example of a control system according to an embodiment of the present invention.

FIG. 3 is a diagram illustrating a configuration example of a control system according to an embodiment of the present invention. A control system 1 includes the work vehicle 10 and the charging station 300. Note that a remote controller for operating a communication terminal possessed by a user that will be described later or the work vehicle 10 may be further included.

As illustrated in FIG. 3, the ECU 44 included in the work vehicle 10 includes a CPU 44a, an I/O 44b, and a memory 44c. The I/O 44b inputs and outputs various types of information. The memory 44c is a read-only memory (ROM), an electrically erasable programmable read-only memory (EEPROM), a random access memory (RAM), or the like. The memory 44c stores a captured image, a work schedule of the work vehicle 10, map information on a work area, various programs for controlling the operation of the work vehicle 10, and the like. In order to operate each processing unit for achieving the present invention, the ECU 44 reads and executes a program stored in the memory 44c.

The ECU 44 is connected with the group of various sensors S. The sensor group S includes an orientation sensor 46, a GPS sensor 48, a wheel speed sensor 50, an angular speed sensor 52, an acceleration sensor 54, a current sensor 62, and a blade height sensor 64.

The orientation sensor 46 and the GPS sensor 48 are sensors for acquiring information on the orientation and position of the work vehicle 10. The orientation sensor 46 detects the orientation in accordance with terrestrial magnetism. The GPS sensor 48 receives a radio wave from a GPS satellite and detects information indicating a current position (latitude and longitude) of the work vehicle 10. To be noted, in addition to or instead of the GPS sensor 48 and the orientation sensor 46, odometry and an inertial measurement unit (IMU) may be provided.

The wheel speed sensor 50, the angular speed sensor 52, and the acceleration sensor 54 are sensors for acquiring information regarding a moving state of the work vehicle 10. The wheel speed sensor 50 detects the wheel speeds of the left and right rear wheels 16. The angular speed sensor 52 detects an angular speed around an axis in the up-and-down direction (z axis in the vertical direction) of the gravity center position of the work vehicle 10. The acceleration sensor 54 detects accelerations in the 3 orthogonally triaxial directions of x, y, and z axes acting on the autonomous work vehicle 10.

The current sensor 62 detects the current consumption (amount of power consumption) of the battery 32. The detection result of the current consumption (amount of power consumption) is stored in the memory 44c of the ECU 44. In a case where a predetermined amount of power is consumed and the amount of power stored in the battery 32 becomes not more than a threshold, the ECU 44 performs returning control for causing the autonomous work vehicle 10 to return to the charging station 300 for charging. Note that a daily work schedule may be stored in the memory 44c, and the returning control may be performed in response to completion of work to be performed on that day.

The blade height sensor 64 detects a height of the blade 20 with respect to a ground surface GR. The detection result of the blade height sensor 64 is output to the ECU 44. On the basis of the control of the ECU 44, the blade-height adjustment motor 100 is driven and the blade 20 moves up and down in the up-and-down direction to adjust the height from the ground surface GR.

Outputs from the group of various sensors S are input into the ECU 44 through the I/O 44b. On the basis of the outputs of the group of various sensors S, the ECU 44 supplies power from the battery 32 to the travel motor 26, the work motor 22, and the height adjustment motor 100. The ECU 44 controls the traveling of the work vehicle 10 by outputting a control value via the I/O 44b and controlling the travel motor 26. In addition, the height of the blade 20 is adjusted by outputting a control value through the I/O 44b and controlling the height adjustment motor 100. Further, the rotation of the blade 20 is controlled by outputting a control value through the I/O 44b to control the work motor 22. Here, the I/O 44b can function as a communication interface and can be connected to another device in a wired or wireless manner via a network 150.

The charging station 300 functions as a charging device for charging a battery (battery 32) of the work vehicle 10. The work vehicle 10 is installed in the work area, and can return to the charging station 300 and perform charging by connecting the charging terminal 34 to the charging station 300.

<Virtual Line Setting Method>

Figure 4A:
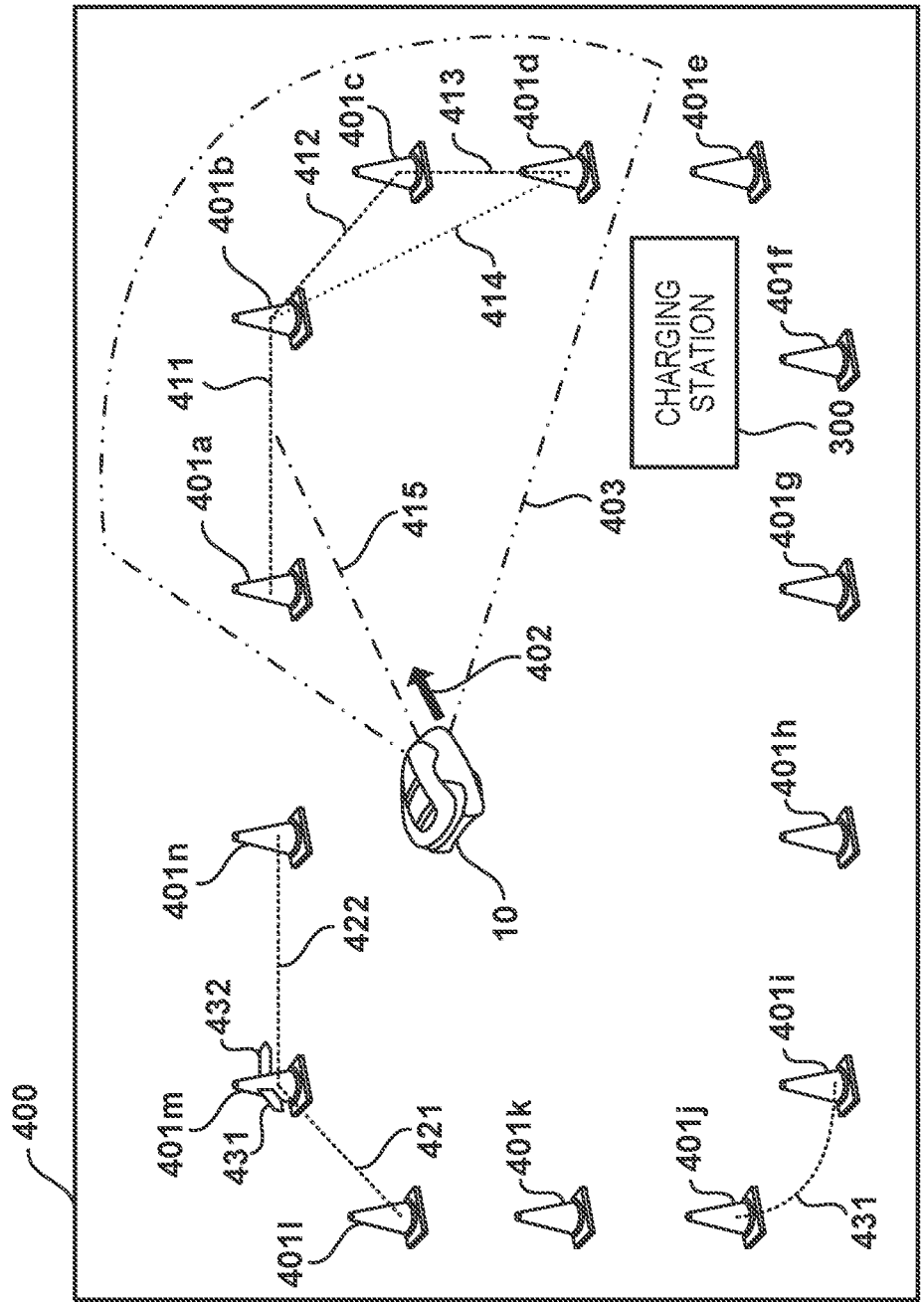
FIG. 4A is an explanatory diagram of a method for setting a virtual line and a method for determining adjacent markers according to an embodiment of the present invention.

A virtual line setting method according to the present embodiment will be described with reference to FIG. 4A. A virtual line is an imaginary line connecting markers arranged to define the work area. In FIG. 4A, reference numeral 400 denotes a region (for example, the entire site owned by a user) including the work area (for example, a garden) where the work vehicle 10 performs work. Reference numerals 401a to 401n denote markers according to the present embodiment. An area surrounded by these markers 401a to 401n is a work area. The work vehicle 10 performs work so as not to deviate from this work area by performing control so as not to deviate to a region beyond the virtual line. Note that the work area may be defined by partitioning the entire site using an existing area wire of a type that is embedded in the ground, and disposing markers in a part of the site to provide a non-entry area. That is, the present invention can also be applied to a case where a work area is defined by combining an existing area wire and a marker.

Reference numeral 402 denotes a traveling direction of the work vehicle 10, and reference numeral 403 denotes a range (for example, an angle of view range) that the work vehicle 10 can recognize by the camera unit 11. In the illustrated example, four markers 401a to 401d are included in the recognizable range. When recognizing the marker, the work vehicle 10 sets a virtual line (virtual wire) between two adjacent markers. In the illustrated example, a virtual line 411 is set between the marker 401a and the marker 401b, a virtual line 412 is set between the marker 401b and the marker 401c, and a virtual line 413 is set between the marker 401c and the marker 401d. To be noted, for example, since the marker 401b and the marker 401d are not adjacent markers, a virtual line is not set.

Here, the virtual line is not limited to a straight line. For example, a smooth curve may be set like a virtual line 431 set between the marker 401i and the marker 401j.

<Adjacent Marker Determination Method 1: Distance Between Markers>

Whether two markers are adjacent markers can be determined based on the distance between the markers in the case where it is assumed that the markers are arranged at predetermined distance intervals. When the distance between the markers is within a predetermined distance range (for example, 2.5 m to 3.5 m), it may be determined that the markers are adjacent markers, and when the distance is out of the predetermined existence range, it may be determined that the markers are not adjacent markers. In FIG. 4A, since the length (for example, 4 m) of a line 414 is out of the predetermined distance range, the line is not set as a virtual line. As a result, it is possible to prevent the work from not being performed in the region of a triangle obtained by connecting the marker 401b, the marker 401c, and the marker 401d.

As described above, according to the determination method 1, among the plurality of markers, two markers whose distance between the markers is within the predetermined distance range are specified as adjacent markers. The predetermined distance range do not have to have an upper limit value or a lower limit value, for example, like 2.5 m or more, 3 m or more, 3 m or less, or 3.5 m or less.

<Adjacent Marker Determination Method 2: Use of Indicator>

To be noted, the method for determining whether two markers are adjacent markers is not limited to a method using the distance between the markers. For example, by using a marker, such as the marker 401m in FIG. 4A, including an indicator (For example, 431 and 432) for indicating a direction in which an adjacent marker is present, each indicator may be detected, and a nearby marker present in the direction indicated by the indicator 431 or 432 may be determined to be an adjacent marker. In the illustrated example, a virtual line 421 is set between the marker 401l and the marker 401m existing in the direction indicated by the indicator 431, and a virtual line 422 is set between the marker 401n and the marker 401n. In this case, each marker may be configured to include indicators indicating at least two directions similarly to 401m.

As described above, according to the determination method 2, each marker includes an indicator indicating the direction in which an adjacent marker exists, and a second marker existing in the direction indicated by the indicator of a first marker can be specified as an adjacent marker. When there are a plurality of markers in the direction indicated by the indicator of the first marker, the marker existing closest to the first marker may be specified as the adjacent marker. In addition, in combination with the determination method 1, a marker in a direction indicated by the indicator and within a predetermined distance range (for example, 2.5 m to 3.5 m) may be specified as an adjacent marker. In addition, the direction indicated by the indicator may be freely changed by the user. For example, the direction of the indicator may be adjustable using a rotation mechanism or the like.

<Adjacent Marker Determination Method 3: Detecting Marker Behind>

In the case of the determination method 1, in the case where three markers are arranged in an equilateral triangle shape at intervals of a predetermined distance (for example, 3 m), or in the case where four markers are arranged in a square shape at intervals of a predetermined distance (for example, 3 m), there is a possibility that it is not possible to enter a region inside the equilateral triangle or the square, and work cannot be performed in these regions.

Figure 4B:
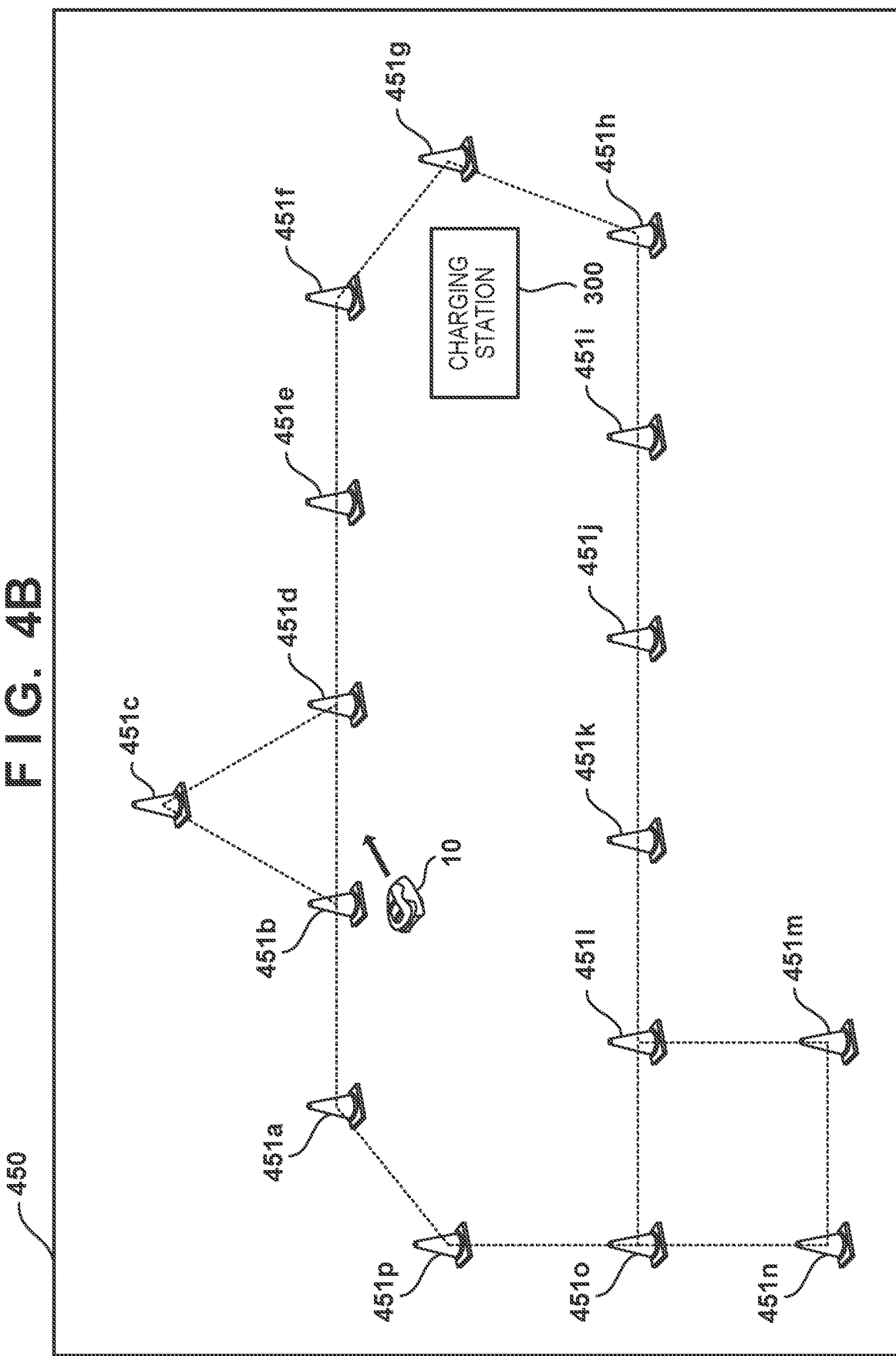
FIG. 4B is an explanatory diagram of a method for determining adjacent markers according to an embodiment of the present invention.

Here, FIG. 4B is an explanatory diagram of a method of determining an adjacent marker in a work area in which an equilateral triangular or square region is formed. Reference numeral 450 denotes a region (for example, the entire site owned by a user) including the work area (for example, a garden) where the work vehicle 10 performs work. Reference numerals 451a to 451p denote markers according to the present embodiment. An area surrounded by these markers 451a to 451p is a work area. The work vehicle 10 performs work so as not to deviate from the work area.

The markers 451a to 451p are arranged at predetermined distance (for example, 3 m) intervals. In this work area, an equilateral triangular region is formed by three markers of the marker 451b, the marker 451c, and the marker 451d. Similarly, a square region is formed by four markers of the marker 451l, the marker 451m, the marker 451n, and the marker 451o. If there are such regions, when the determination method 1 is used, the work vehicle 10 cannot move to a region behind the virtual line connecting the marker 451b and the marker 451c and the virtual line connecting the marker 451l and the marker 451o, so that the work cannot be performed in these regions.

Therefore, when another marker is detected behind the two markers, it may be determined that the two markers are not adjacent markers. In the illustrated example, two markers of the marker 451b and the marker 451d are detected, and the other marker 451c is further detected behind the two markers. Therefore, it is determined that the two markers 451b and 451d are not adjacent markers. Similarly, two markers of the marker 451l and the marker 451o are detected, and the other markers 451m and 451n are further detected behind the two markers. Therefore, it is determined that the two markers 451l and 451o are not adjacent markers.

As a result, no virtual line is set between the marker 451b and the marker 451c and between the marker 451l and the marker 451o, so that the work vehicle 10 can enter an equilateral triangular area and a square area to perform work.

As described above, according to the determination method 3, when another marker is present in a region behind a line connecting two markers, it is specified that the two markers are not adjacent markers. However, when the determination method 3 is applied, in the case where another marker at a position far away from the two markers is detected, there is a possibility of erroneous entry to the back region. Therefore, a configuration in which movement to the back region is only possible when the distance to the other marker is calculated and the calculated distance is equal to or less than a predetermined distance (for example, 4 m), or when it is determined that the other marker is a marker adjacent to either one of the two markers on the front side. As a result, it is possible to suppress entry into a region that should not be originally entered.

<Adjacent Marker Determination Method 4: Tracing Markers in Advance>

Figure 4C:
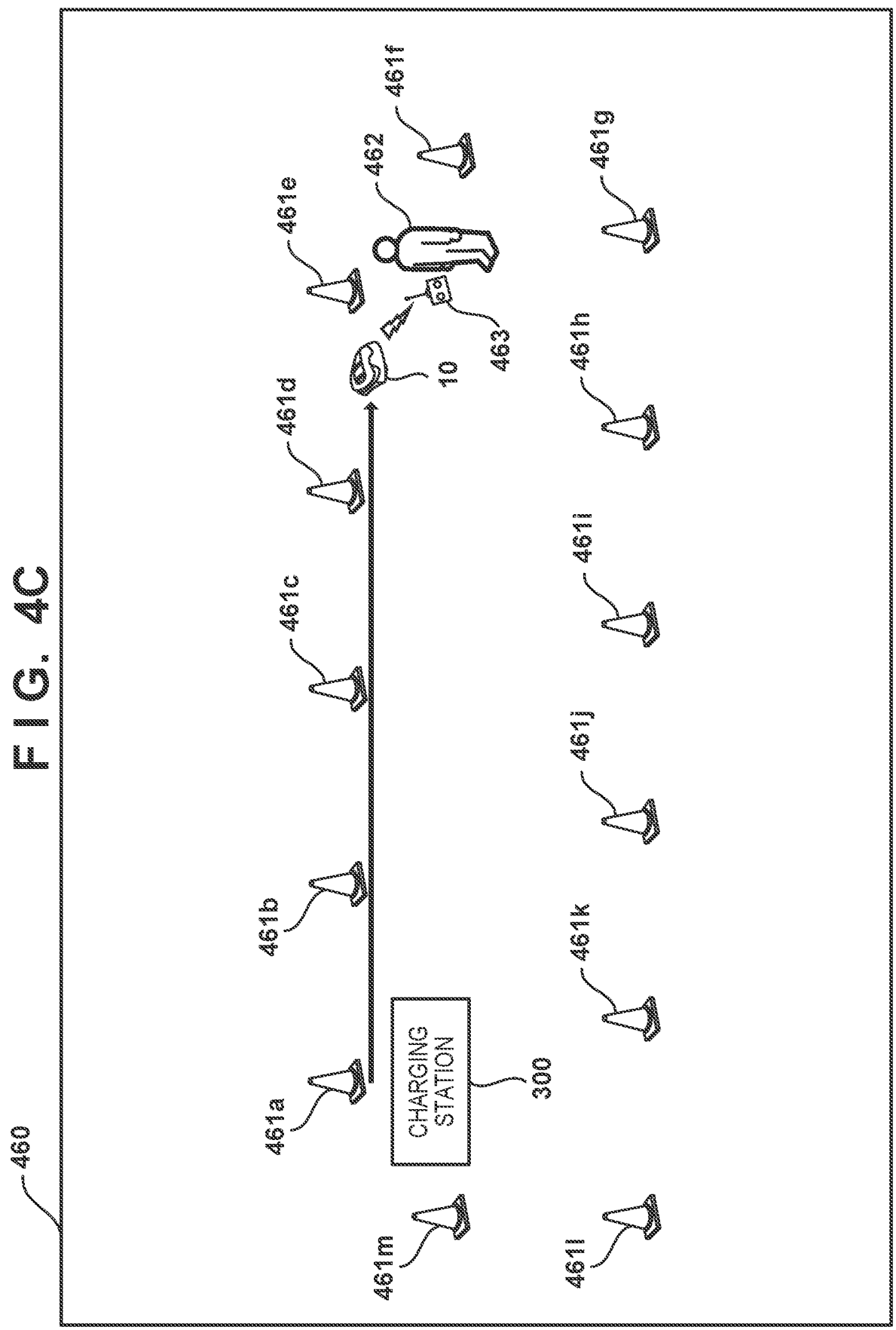
FIG. 4C is an explanatory diagram of a method for determining adjacent markers according to an embodiment of the present invention.

FIG. 4C is an explanatory diagram of an example of a method of determining adjacent markers. Reference numeral 460 denotes a region (for example, the entire site owned by a user) including the work area (for example, a garden) where the work vehicle 10 performs work. Reference numerals 461a to 461m denote markers according to the present embodiment. An area surrounded by these markers 461a to 461m is a work area. The work vehicle 10 performs work so as not to deviate from the work area.

Before starting work by the work vehicle 10, a user 462 directly controls the work vehicle 10 by operating a remote controller 463, and moves the work vehicle 10 one lap along each marker. An operation signal from the remote controller 463 is received via the communication unit 35 of the work vehicle 10.

In addition, the work vehicle 10 includes a GPS sensor 48, and stores a trajectory obtained by sequentially tracing each marker according to the operation signal of the remote controller 463 as trajectory information of the work area. As a result, since the trajectory information of the work area can be grasped before the start of the work, it is possible to determine whether or not the two markers are adjacent markers, by determining that markers not following the trajectory are not adjacent markers after the start of the work.

As described above, according to the determination method 4, the trajectory information of the work vehicle 10 is acquired by causing the work vehicle 10 to travel along each of the arranged markers. As a result, two markers matching the trajectory information among the plurality of markers can be specified as adjacent markers.

<Adjacent Marker Determination Method 5: Drawing Work Area Boundary on Map by Communication Terminal>

Figure 4D:
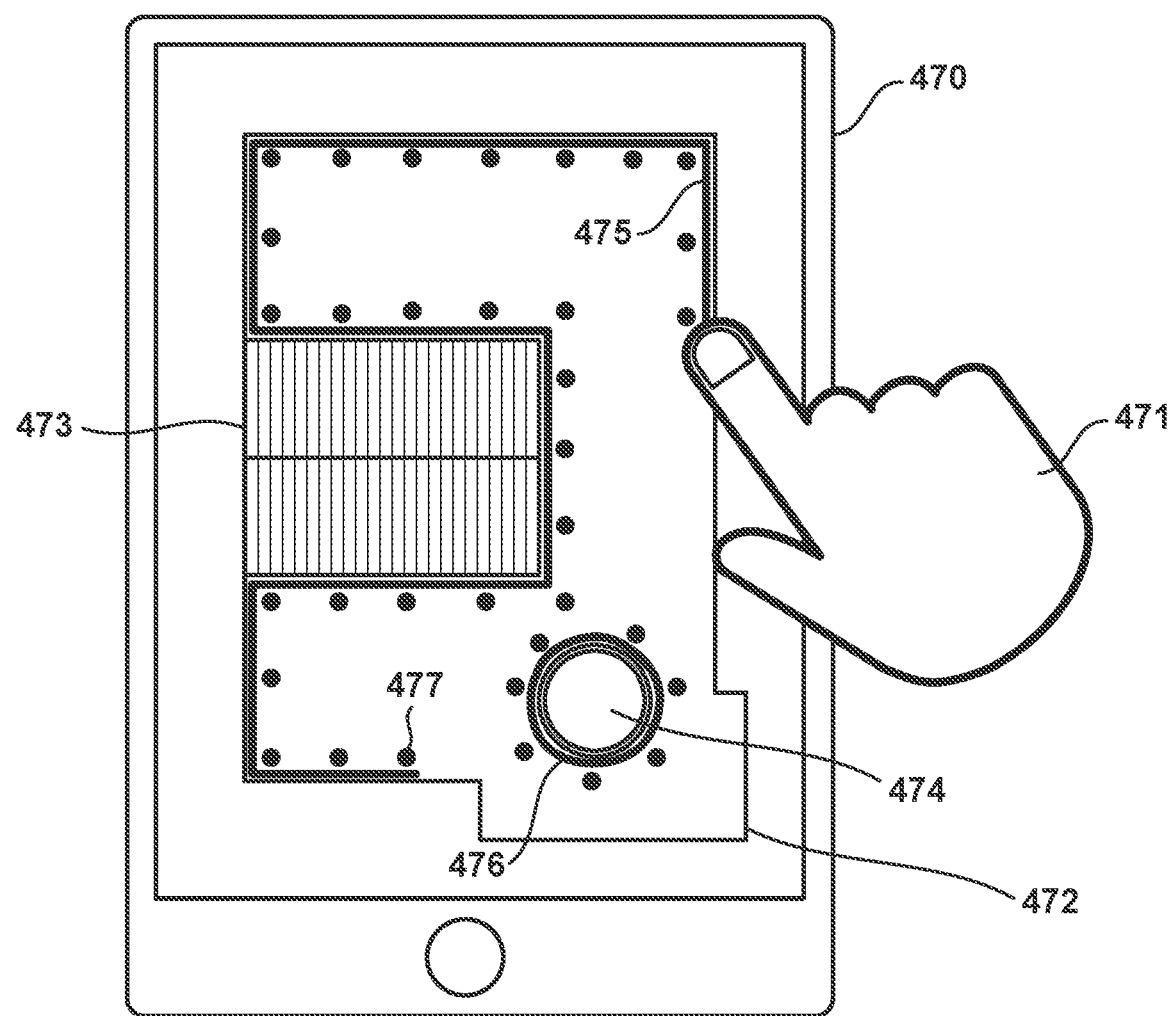
FIG. 4D is an explanatory diagram of a method for determining adjacent markers according to an embodiment of the present invention.
Figure 4E:
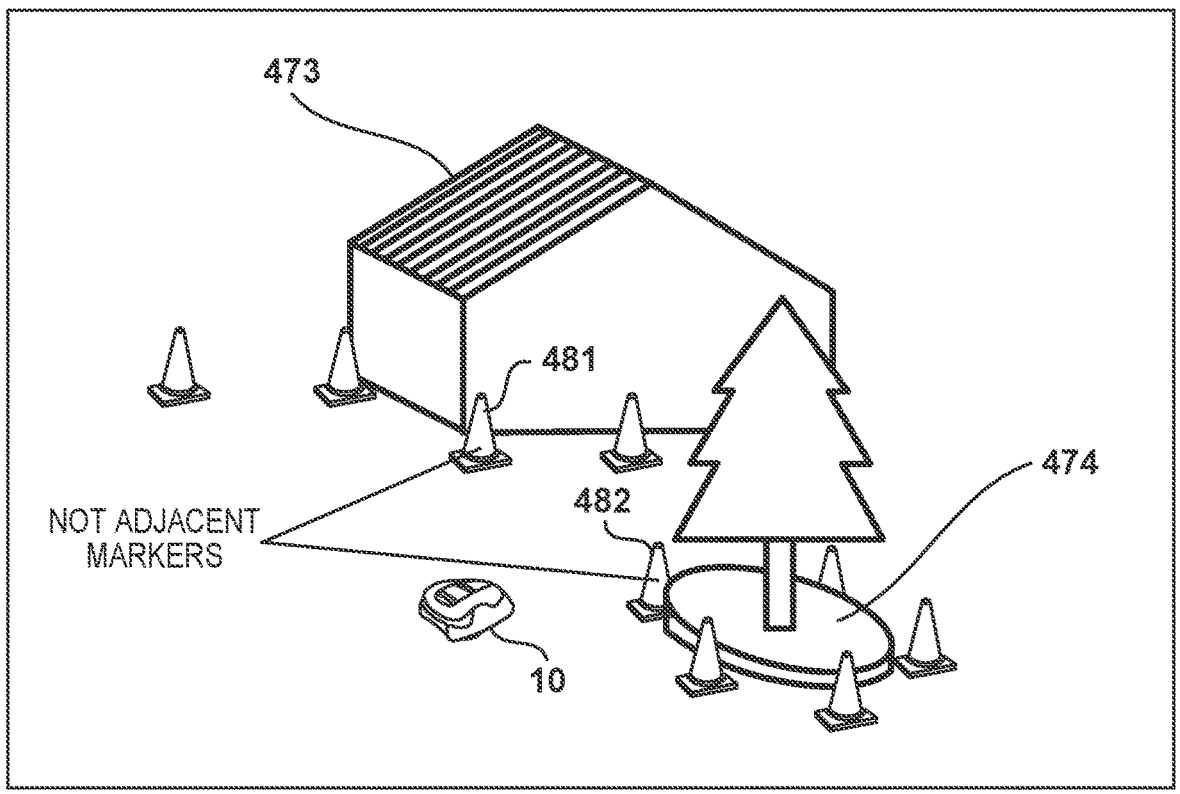
FIG. 4E is an explanatory diagram of a method for determining adjacent markers according to an embodiment of the present invention.

FIG. 4D is a diagram illustrating an example of drawing something on a map related to a work area displayed on a communication terminal held by a user. Reference numeral 470 denotes a communication terminal of the user, which is, for example, a tablet or a smartphone. Reference numeral 471 denotes a hand of the user. Reference numeral 472 represents map information on the work area displayed on a display screen of the communication terminal 470. In the illustrated example, a map of a site including a home and a garden of the user as viewed from above is displayed. Reference numeral 473 denotes a roof of the user's home, and reference numeral 474 denotes a tree space in a site of the user's home. Here, FIG. 4E is an external view of a part of the site including the user's home corresponding to the map information of FIG. 4D.

In FIG. 4D, reference numeral 475 denotes a boundary traced on the map by the user using a finger of the hand 471. Similarly, reference numeral 476 indicates a boundary traced around the tree space by the user using the finger of hand 471. A tree spaces 474 is an island excluded from the work area. Note that the boundary may be designated by connecting positions pointed by a finger instead of tracing using the finger.

In this manner, the boundary of the work area is designated on a map displayed on the communication terminal 470, and the designated boundary information (information indicating the position of a boundary line) is transmitted to the work vehicle 10. As a result, since the work vehicle 10 can acquire the boundary information designated by the user operation, the work vehicle 10 can recognize its self-position and orientation using the GPS sensor 48 and the orientation sensor 46, and determine whether or not two detected markers are adjacent markers using the self-position and orientation and the boundary information. In the example of FIG. 4E, the work vehicle 10 can determine that a marker 481 and a marker 482 are not adjacent markers from the acquired boundary information. To be noted, the self-position and orientation may be recognized by using, in addition to or instead of the GPS sensor 48 and the orientation sensor 46, an odometry and an inertial measurement unit (IMU).

To be noted, the method of tracing the boundary is not limited to the method in which the user traces the boundary using the finger of the hand 471. As indicated by black circles 477 in FIG. 4D, the user may sequentially point out a plurality of positions of markers on the map along the boundary using the finger of the hand 471 to acquire marker arrangement information as the boundary information. The boundary information may be transmitted from the communication terminal 471 to the work vehicle 10.

Even in a case where the position of each marker is pointed out, it is possible to determine whether or not two detected markers are adjacent markers by using the self-position and orientation and the boundary information (marker arrangement information). For example, in the example of FIG. 4E, the work vehicle 10 can determine that the marker 481 and the marker 482 are not adjacent markers from the boundary information (marker arrangement information).

As described above, according to the determination method 5, the boundary information (for example, arrangement information of a plurality of markers arranged at the boundary of the work area (position information designated by pointing) or information of a boundary line (line traced with a finger) indicating the boundary of the work area) of the work area designated on the map including the work area is acquired. As a result, two markers matching the boundary information among the plurality of markers can be specified as adjacent markers.

<Adjacent Marker Determination Method 6: Enclosing Island with Different Types of Markers>

Figure 4F:
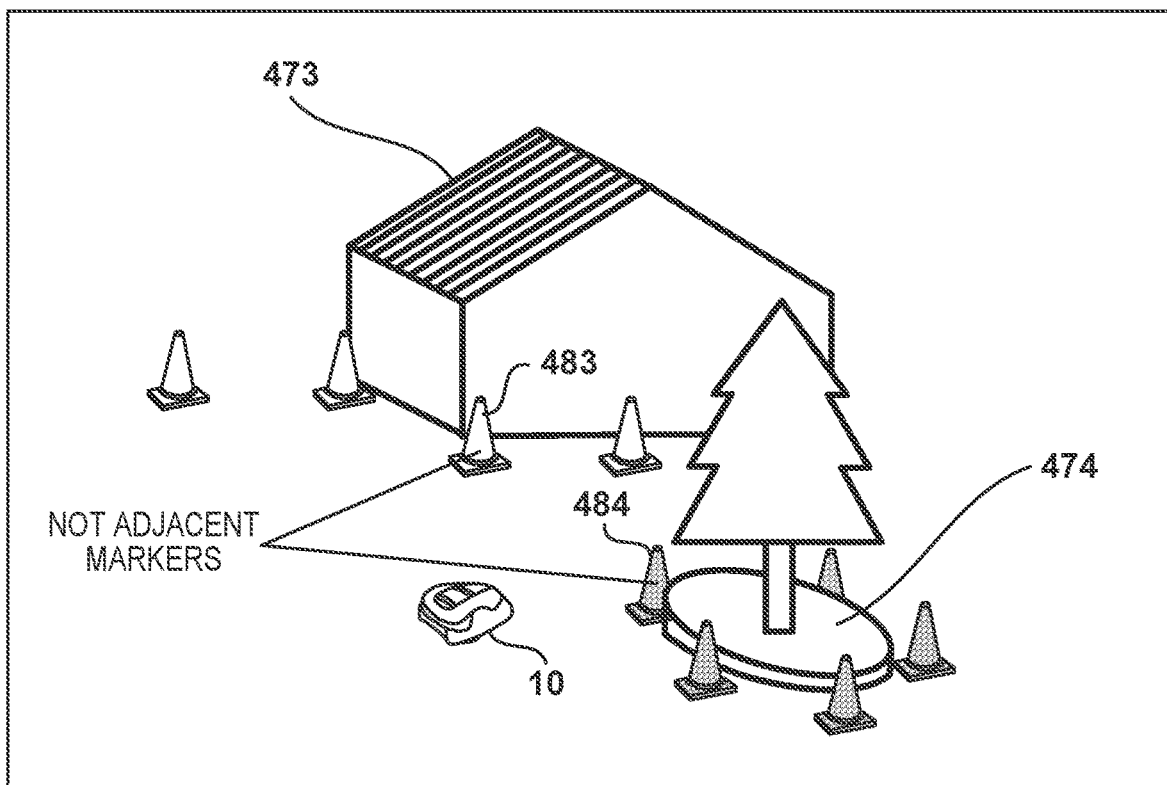
FIG. 4F is an explanatory diagram of a method for determining adjacent markers according to an embodiment of the present invention.

FIG. 4F illustrates an example of a method using two types of markers. Different types (For example, different colors, different shapes, and the like) of markers are respectively used for each marker arranged on the boundary of the work area and each marker arranged around the tree space 474 which is an island excluded from the work area. As a result, the work vehicle 10 can discriminate different types of markers from the features of the markers extracted from the captured image, and the work vehicle 10 can determine that a marker 483 and a marker 484 are not adjacent markers from the captured image.

Note that the marker is not limited to two types of markers, and in a case where there are a plurality of islands, different types of markers may be used for respective islands. Therefore, the present invention is also applicable to a case where three or more types of markers are used.

In this manner, a plurality of first type markers defining the outer edge of the work area and a plurality of second type markers defining the internal region (island) enclosed by the outer edge and excluded from the work area are used. This allows the first type markers and the second type markers to be identified as not being adjacent markers.

<Adjacent Marker Determination Method 7: Using Different Types of Markers for Respective Distances>

FIG. 4G is a diagram illustrating an example in which markers are arranged at short intervals in a region having a complicated shape. Reference numerals 491a to 491e each denote a marker for a first distance (for example, 3 m) interval. Reference numerals 492a to 492f each denote a marker for a second distance (for example, 1 m) interval. The first type markers for the first distance interval and the second type markers for the second distance interval are different types of markers having, for example, different colors, shapes, sizes, or the like.

In the illustrated example, the marker 491b, the marker 491c, and the marker 491d form an equilateral triangle shape, and the marker 491c, the marker 491d, and the marker 491e also form an equilateral triangle shape. A case where only the markers 491a to 491e are arranged in such a complicated shape will be considered. If it is determined that two markers are not adjacent markers when another marker is detected behind the two markers as in the determination method 3, for example, in the case where the work vehicle is traveling toward a position between the marker 491c and the marker 491d, the marker 491e is detected at the back, so that the work vehicle can travel in a direction approaching the marker 491*e* at the back beyond the boundary of the work area connecting the marker 491*c* and the marker 491*d*.

Therefore, the markers 492*a* to 492*f* are further arranged at places having complicated shapes. Accordingly, since the work vehicle 10 further detects the marker 492*c* and the marker 492*d* on the line connecting the marker 491*c* and the marker 491*d*, it is possible to determine that the two markers (the marker 491*c* and the marker 491*d*) are adjacent markers. Therefore, it is possible to prevent the work vehicle 10 from deviating to the back region beyond the boundary of the work area connecting the marker 491*c* and the marker 491*d*. To be noted, although a case where the two markers 492*c* and 492*d* are detected is has been described for the illustrated example, it may be determined that the two markers (the marker 491*c* and the marker 491*d*) are adjacent markers when either the marker 492*c* or the marker 492*d* is detected on the line connecting the marker 491*c* and the marker 491*d*.

As described above, according to the determination method 7, the plurality of first type markers arranged at the first distance intervals and the plurality of second type markers arranged at the second distance intervals shorter than the first distance intervals are used. Accordingly, when one or more second type markers are present between two first type markers among a plurality of first type markers, the two first type markers can be identified as adjacent markers.

<Processing>

Figure 5A:
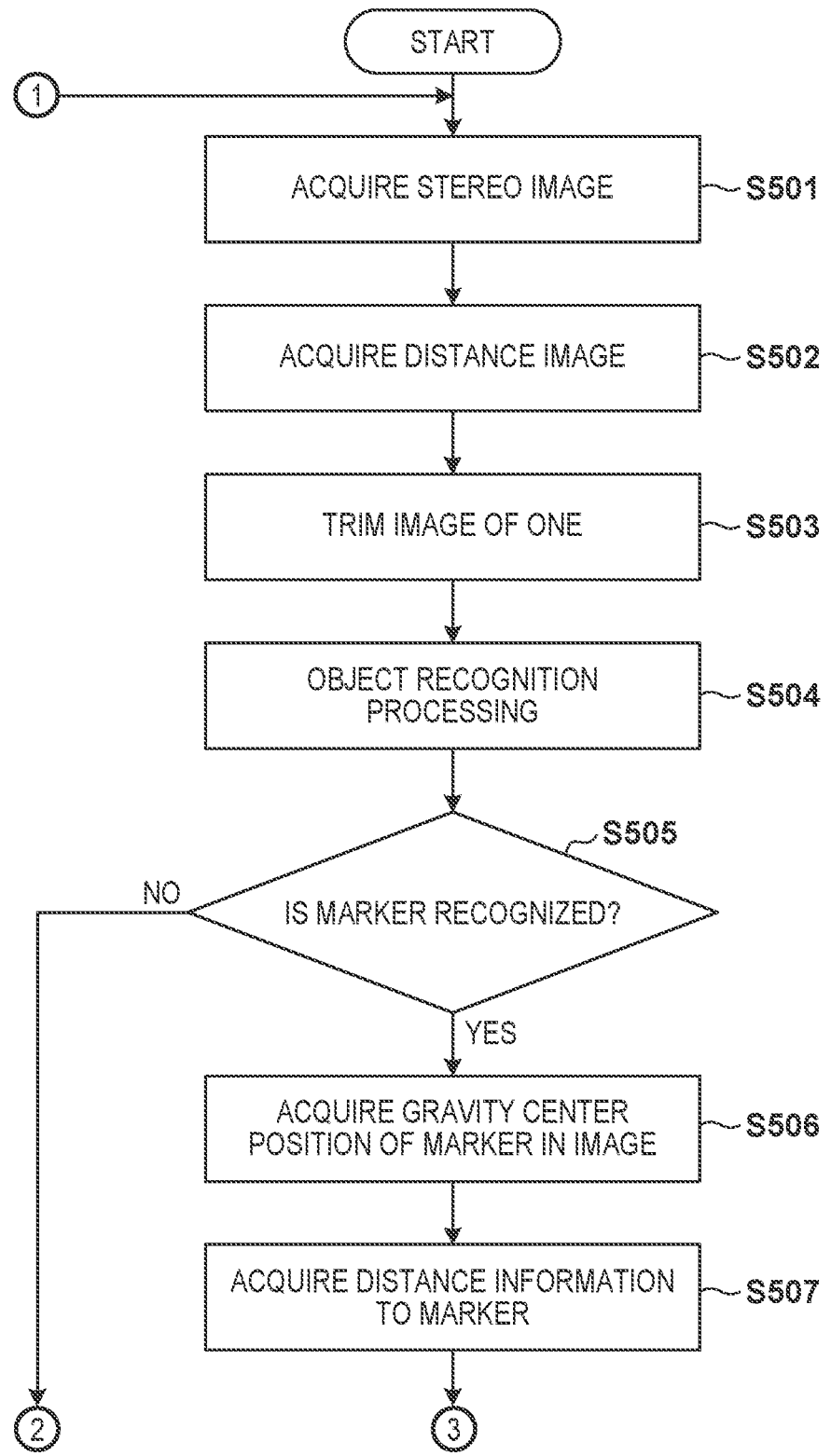
FIG. 5A is a flowchart illustrating a procedure of processing performed by an autonomous work machine according to a first embodiment.
Figure 5B:
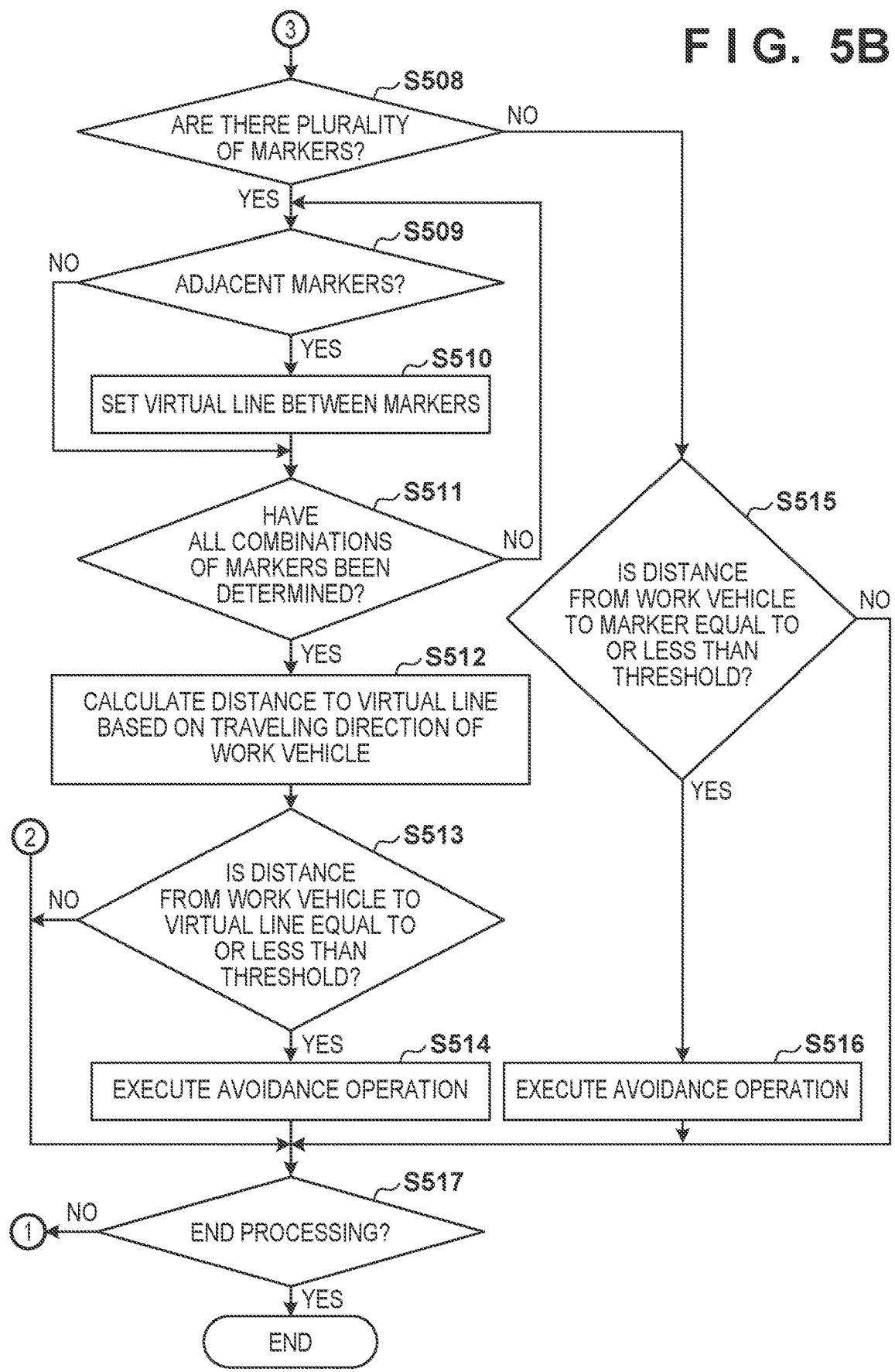
FIG. 5B is a flowchart illustrating a procedure of processing performed by the autonomous work machine according to the first embodiment.

Next, a procedure of processing performed by the work vehicle 10 according to the present embodiment will be described with reference to flowcharts of FIGS. 5A and 5B. The work vehicle 10 according to the present embodiment sets a virtual line between markers and performs control so that the work vehicle 10 does not deviate to a region beyond the virtual line.

In step S501, the CPU 44*a* acquires a stereo image captured by the camera unit 11.

In step S502, the CPU 44*a* acquires a distance image based on the stereo image.

In step S503, the CPU 44*a* trims an image of one of the first camera 11*a* and the second camera 11*b* constituting the camera unit 11. In the present embodiment, an image of the second camera 11*b* is used.

In step S504, the CPU 44*a* executes object recognition processing using the trimmed image. Features of objects including persons and markers are learned in advance by machine learning, and an object is recognized by comparison with the learning result.

In step S505, the CPU 44*a* determines whether or not a marker has been recognized as a result of the object recognition processing in step S504. In the case where it is determined that a marker has been recognized, the process proceeds to step S506. In the case where it is determined that a marker has not been recognized, the process proceeds to step S517.

In step S506, the CPU 44*a* acquires the gravity center position of the marker in the image. For example, a specific position of the marker is specified as the gravity center position based on information of the gravity center position of the marker held in advance. Note that the gravity center position is merely an example, and is not limited to the gravity center position. The position may be a top position of the marker, or may be a ground contact position where the marker and the ground are in contact with each other.

In step S507, the CPU 44*a* acquires distance information from the work vehicle 10 to the gravity center position of the marker as marker information using the distance image acquired in step S502.

In step S508, the CPU 44*a* determines whether or not a plurality of markers have been recognized in step S505. In the case where it is determined that a plurality of markers have been recognized, the process proceeds to step S509. In the case where only a single marker has been recognized, the process proceeds to step S515.

In step S509, the CPU 44*a* determines whether or not two markers included in the plurality of markers are adjacent markers. In the present embodiment, whether or not the distance between the two markers is within a predetermined distance range is determined, and when the distance is within the predetermined distance range, it is determined that the markers are adjacent markers. In the present embodiment, it is assumed that the markers are installed at intervals of 3 m, but the markers are not necessarily arranged at equal intervals of 3 m, and there is a possibility that some deviation occurs. Therefore, it is determined that the markers are adjacent markers if the markers are within the predetermined distance range, for example, in a range of 2.5 m to 3.5 m. In the case where it is determined that the markers are adjacent markers, the process proceeds to step S510. In contrast, in the case where it is determined that the markers are not adjacent markers, the process proceeds to step S511. As a method of determining whether or not the markers are adjacent markers, other determination methods described with reference to FIGS. 4A to 4G may be used.

In step S510, the CPU 44*a* sets a virtual line between the two markers determined to be adjacent markers.

In step S511, the CPU 44*a* determines whether or not the determination has been completed for all combinations of two markers among the plurality of markers. When the determination is completed for all the combinations, the process proceeds to step S512. In contrast, in the case where there remains a combination for which the determination has not been performed yet, the process returns to step S509, and the determination is performed on a new combination of two markers.

In step S512, the CPU 44*a* calculates the distance from the work vehicle 10 to a virtual line located ahead of the work vehicle 10 in the traveling direction based on the traveling direction of the work vehicle 10 and the virtual line located ahead in the traveling direction. In the example of FIG. 4A, the distance to an intersection with the virtual line 411 located ahead in the traveling direction 402 is calculated.

Figure 6:
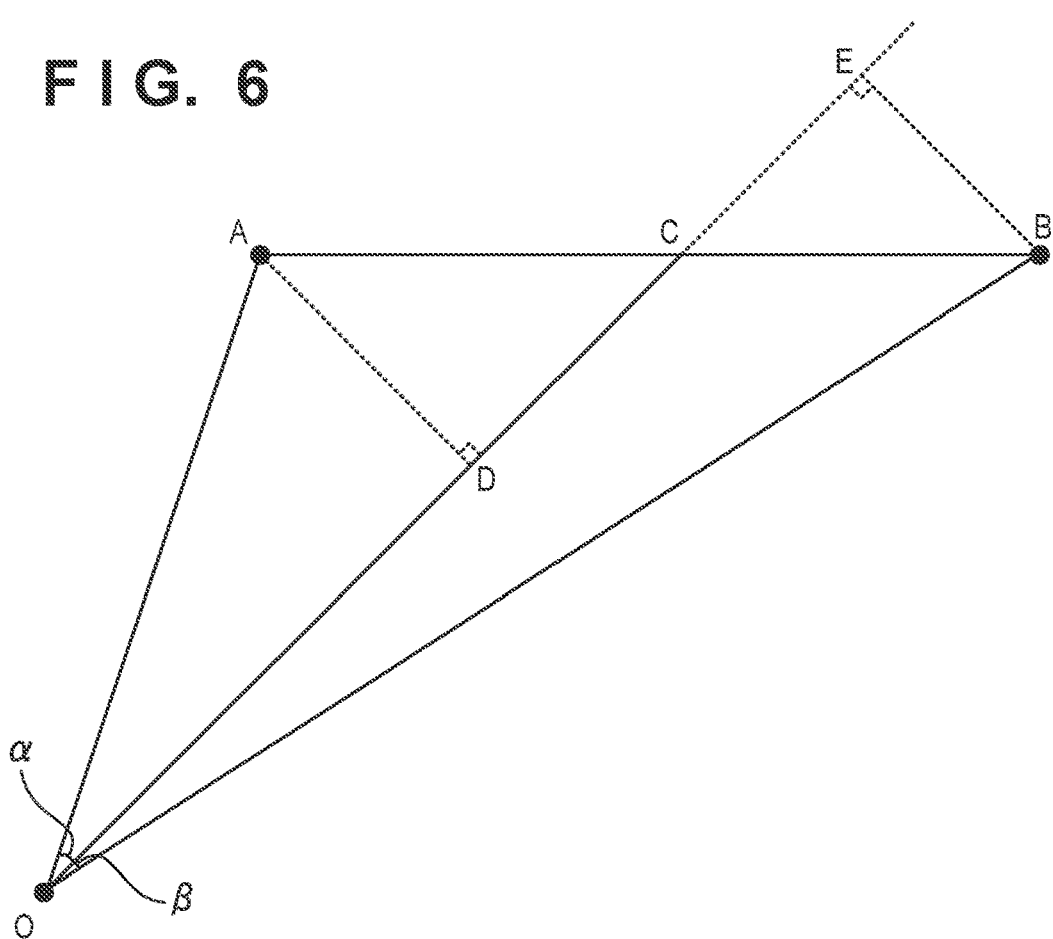
FIG. 6 is an explanatory diagram of how to obtain a distance to a virtual line according to an embodiment of the present invention.
Figure 7:
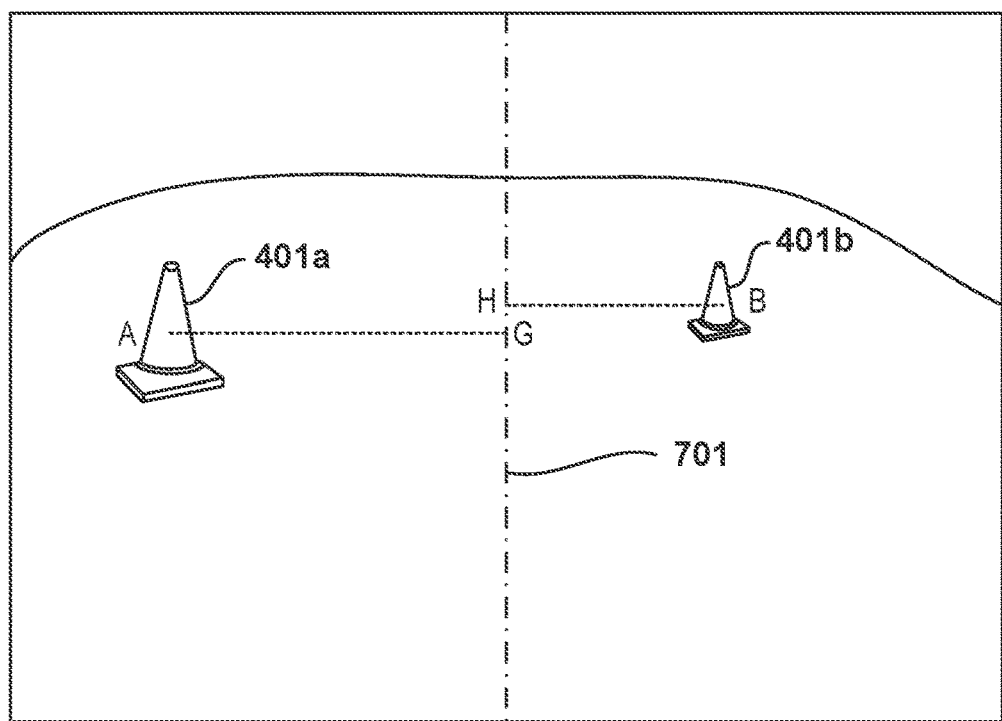
FIG. 7 is a diagram illustrating an example of a captured image according to an embodiment of the present invention.

Here, an example of a method of calculating the distance to the intersection with the virtual line 411 located ahead in the traveling direction 402 will be described with reference to FIG. 6. In FIG. 6, a point O is a current position of the work vehicle 10. A point A corresponds to the marker 401*a* in FIG. 4A, and a point B corresponds to the marker 401*b* in FIG. 4A. When the distance to be obtained is X, X is the length of a line OC. Here, the length of a line OA and the length of a line OB can be obtained from the distance image. Furthermore, an angle $\alpha$ and an angle $\beta$ can also be obtained from the imaging direction (normally, the same direction as the traveling direction 402) and the viewing angle of the camera unit 11, and the directions of the point A and the point B. Then, a perpendicular line is drawn down from the point A to the line OC, and an intersection thereof is defined as D. Similarly, a perpendicular line is drawn down from the point B to an extension line of the line OC, and an intersection thereof is defined as E. At this time, since a triangle ACD and a triangle BCE are similar, AD:BE=CD:CE holds. Then, as illustrated in FIG. 7 illustrating an example of the captured image, the ratio between AD and BE can be obtained from the ratio of the distance from a center line 701 of the image of one camera captured by the camera unit 11 (that is, the ratio of the length between AG and BH).

In FIG. 6, AD=OA sin α, BE=OB sin β, CD=OC−OA cos α, and CE=OB cos β−OC hold, and therefore a distance X to the point C can be obtained by AD:BE=CD:CE
↔OA sin α:OB sin β=OC−OA cos α:OB cos β−OC
↔OC=OAOB×(sin α cos β+cos α sin β)/(OB sin β+OA sin α)
=OAOB sin(α+β)/(OB sin β+OA sin α)
=X In step S513, the CPU 44a determines whether or not the distance from the work vehicle 10 to the virtual line located ahead of the work vehicle 10 in the traveling direction is equal to or less than a threshold value (for example, 0.1 m). When it is determined that the distance is equal to or less than the threshold, the process proceeds to S514. In contrast, in the case where the distance is larger than the threshold value, the process proceeds to step S517.

In step S514, the CPU 44a executes an avoidance operation based on the virtual line. Specifically, when the work vehicle 10 approaches a threshold (for example, 0.1 m) from the virtual line, the work vehicle 10 stops, moves backward, or turns. Accordingly, it is possible to prevent the work vehicle 10 from deviating to a region beyond the virtual line. For example, the work vehicle 10 stops, moves backward, or turns the work vehicle 10 when the distance from the work vehicle 10 to the virtual line 415 becomes equal to or less than the threshold so as not to deviate to the back region beyond the intersection position of the line 415 extending in the traveling direction 415 and the virtual line 411 existing in the traveling direction 415 illustrated in FIG. 4A. As a result, the work vehicle 10 can perform work without deviating from the work area. Here, the turning is to change the traveling direction of the work vehicle 10, and includes moving along a parabolic trajectory when the site is viewed from above, rotating on the spot after stopping at a certain point to change the traveling direction, and going around so as not to enter the region defined by the virtual line.

When the distance to the virtual line becomes equal to or less than another threshold value (for example, 1.5 m), control for lowering the traveling speed of the work vehicle 10 heading for the virtual line 415 may be further performed. By decelerating in advance before performing an avoidance operation such as stop, backward movement, or turning, it is possible to suppress sudden operation such as sudden stop, sudden backward movement after sudden stop, or sudden turning.

In step S515, the CPU 44a determines whether or not the distance from the work vehicle 10 to the marker is equal to or less than a threshold. The threshold here is, for example, 0.5 m, but is not limited to this value. When it is determined that the distance is equal to or less than the threshold, the process proceeds to S516. In contrast, in the case where the distance is larger than the threshold value, the process proceeds to step S517.

In step S516, the CPU 44a executes the avoidance operation. Specifically, when the work vehicle 10 stops, moves backward, or turns when reaching a threshold distance (for example, 0.5 m) from a marker. Since only one marker is detected, the avoidance operation is performed independently of the virtual line. Thereafter, the process proceeds to step S517.

In step S517, the CPU 44a determines whether to end the series of processing. For example, there are a case where the remaining battery charge becomes equal to or lower than a threshold and it is necessary to return to the charging station 300, a case where a predetermined time has elapsed from the start of work, and a case where work in the work area has been completed (for example, the lawn in the work area has been mowed). This also applies to a case where the user operates the power source of the work vehicle 10 to be turned off. In the case where it is determined not to end the series of processing, the process returns to step S501. In contrast, in the case where it is determined to end the series of processing, the processing of FIGS. 5A and 5B is ended.

As described above, in the present embodiment, two markers are detected, and a virtual line is set between the markers. Then, the avoidance operation is executed so that the work vehicle does not deviate to the back region beyond the virtual line. As a result, it is possible to control the work machine using the same type of marker, and it is not necessary to prepare a plurality of markers having different features so that each of the markers can be distinguished. Therefore, it is also possible to reduce the introduction cost of the marker. In addition, in order to set the virtual line (virtual wire), it is not necessary to provide an area wire (for example, a wire embedded in the ground) for defining the work area, so that the cost can be reduced. To be noted, as described above, an existing area wire and a marker may be combined to define the work area, and in this case, the area wire does not have to be provided for some regions, so that the cost can be reduced. Further, since the markers can be freely arranged, the shape of the work area can be flexibly changed. For example, in the case where the user himself/herself works in a part of a garden, there is a case where the work vehicle is not desired to enter the area. In this case, by defining the region so as to be surrounded by markers, it is possible to easily create an area where the work vehicle does not temporarily enter.

[Modifications]

To be noted, when it is necessary to return to the charging station 300 or when it is necessary to move to a predetermined position, the CPU 44a sets a travel route for the work vehicle 10 to travel according to the set travel route. At that time, the travel route is set such that the virtual line does not exist on the travel route. Accordingly, it is possible to prevent traveling beyond the virtual line and deviating.

In addition, although an example in which the processing is performed in consideration of combinations of two markers for all the detected markers has been described in step S511, markers on the left and right of the line along the traveling direction may be set as processing targets based on the traveling direction of the work vehicle 10. For example, in the example of FIG. 4A, it is possible to set only markers on the left and right of the line 415 along the traveling direction 415 instead of processing all the combinations (6 combinations) of the four markers 401a to 401d. In this case, three combinations of the marker 401a and the marker 401b, the marker 401a and the marker 401c, and the marker 401a and the marker 401d may be set as processing targets, and three combinations of the marker 401b and the marker 401c, the marker 401b and the marker 401d, and the marker 401c and the marker 401d may be excluded from the processing targets. This makes it possible to speed up the processing.

In addition, in the present embodiment, an example has been described in which, when the distance from the work vehicle 10 to the virtual line is larger than the threshold in step S513, the process returns to step S501 through step S517, and the stereo image is acquired again. However, in the case re-capturing images all the time, as the work vehicle 10 travels and approaches the virtual line, a plurality of markers may come to not be detected. Therefore, instead of necessarily returning to step S501 and re-capturing images, control may be performed such that the timing at which the distance from the work vehicle 10 to the virtual line becomes equal to or less than the threshold is estimated on the basis of the traveling speed of the work vehicle 10, and the avoidance operation is executed when that timing arrives. Alternatively, a distance from a certain point to the virtual line is calculated, and thereafter, a moving distance from the point is constantly measured by odometry, an inertial measurement unit (IMU), or the like. Then, the operation of the work vehicle 10 may be controlled based on the calculated distance and the moving distance being measured. For example, the avoidance operation may be executed in response to the moving distance being measured reaching the "distance from the point to the virtual line".

In addition, in steps S512 and S513, an example in which the avoidance operation is controlled on the basis of the distance between the work vehicle 10 and the virtual line has been described, but it is not limited to the distance. For example, a time required for the work vehicle 10 to reach the virtual line 411 may be calculated, and whether or not the work vehicle 10 has reached the virtual line may be determined on the basis of the calculated time. For example, the time may be calculated based on the traveling speed of the work vehicle 10 and the distance from the work vehicle 10 to the virtual line 411. Then, the avoidance operation may be controlled to be executed when the difference between the time and the elapsed time is equal to or less than a threshold. Similarly, in step S515, an example in which the avoidance operation is controlled on the basis of the distance between the work vehicle 10 and a marker has been described, but it is not limited to the distance. For example, a time required for the work vehicle 10 to reach the marker may be calculated, and whether or not the work vehicle 10 has reached the marker may be determined on the basis of the calculated time.

In addition, control may be performed in parallel with repeating the processing by returning to step S501, such that the avoidance operation is separately executed when the timing at which the distance from the work vehicle 10 to the virtual line becomes equal to or less than the threshold arrives.

Second Embodiment

In the first embodiment, an example has been described in which distance information to a detected marker is acquired as marker information, and the avoidance operation is performed by calculating the distance from the work vehicle to the virtual line and the time until the work vehicle reaches the virtual line are calculated using the distance information. In contrast, in a second embodiment, an example will be described in which marker position information indicating position coordinates of a marker is acquired as marker information, and the avoidance operation is performed by calculating a distance from the work vehicle to the virtual line and a time until the work vehicle reaches the virtual line by using the marker position information and self-position information and orientation information of the work vehicle.

Since the system configuration and the configuration of the autonomous work machine are similar to those described in the first embodiment, the description thereof will be omitted.
<Processing>

Figure 8A:
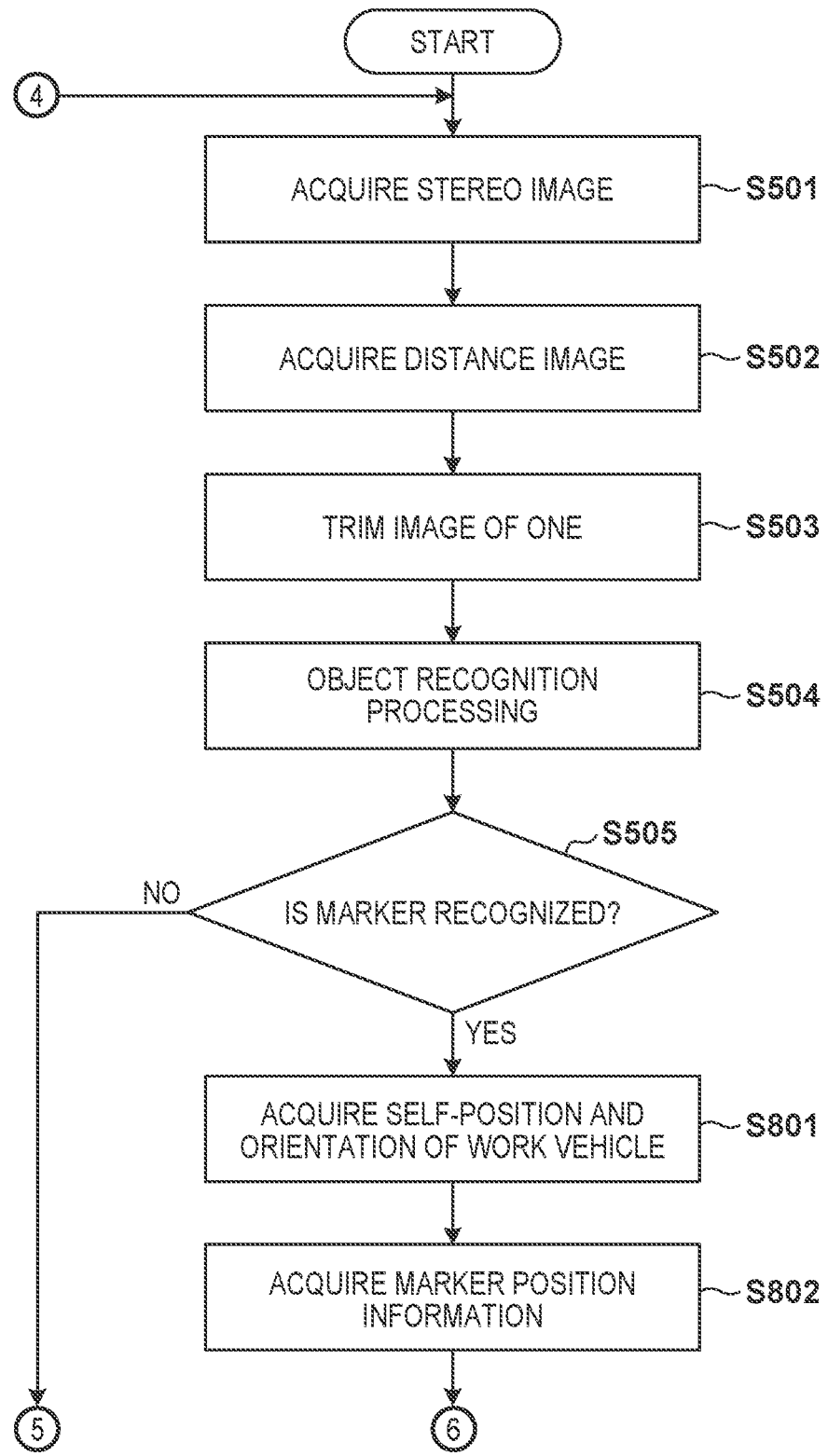
FIG. 8A is a flowchart illustrating a procedure of processing performed by an autonomous work machine according to a second embodiment.

Next, a procedure of processing performed by the work vehicle 10 according to the present embodiment will be described with reference to flowcharts of FIGS. 8A and 8B. The work vehicle 10 according to the present embodiment sets a virtual line between markers and performs control so that the work vehicle 10 does not deviate to a region beyond the virtual line. Steps of performing the same processes as those in the flowcharts of FIGS. 5A and 5B are denoted by the same reference numerals. Hereinafter, differences from FIGS. 5A and 5B will be mainly described.

In step S801, the CPU 44a acquires information on the self-position and orientation using the GPS sensor 48 and the orientation sensor 46.

In step S802, the CPU 44a acquires marker position information (position coordinates) of the detected marker as marker information. For example, as described with reference to FIG. 4D in the first embodiment, the marker position information is stored in advance in the memory 44c as map information so that the marker position information can be referred to. The work vehicle 10 recognizes its self-position and orientation using the GPS sensor 48 and the orientation sensor 46, specifies which marker included in the map information is the marker detected from the image captured by the camera unit 11, and acquires marker position information of the detected marker.

Alternatively, the marker position information can be specified from the landscape information of the image captured by the camera unit 11. For example, landscape information and a marker included in an image are stored in advance in association with distance information to the marker obtained by measurement distance in the landscape. Then, while the work vehicle 10 is caused to travel in the work area, the association is performed at various places and stored as learning information. Then, by referring to this learning information, position coordinates of the marker detected from the image captured by the camera unit 11 can be acquired as marker position information using the self-position and orientation recognized using the GPS sensor 48 and the orientation sensor 46.

Alternatively, the work vehicle 10 recognizes its self-position and orientation using the GPS sensor 48 and the orientation sensor 46, and acquires, on the basis of an image having parallax (S501 and S502), distance information (distance image) to a marker detected from an image captured by the camera unit 11. Furthermore, an angle (for example, the angle α or the angle β in FIG. 6) at which the marker exists with respect to the photographing direction of the camera unit 11 is obtained from the position of the marker with respect to the image center of the captured image. Then, a direction in which the marker is present may be specified from the orientation of the work vehicle 10 and the acquired angle, and position coordinates that is ahead along the direction by a distance indicated by the acquired distance information may be acquired as the marker position information.

In step S803, the CPU 44a determines whether or not two markers included in the plurality of markers are adjacent markers. Also in the present embodiment, the determination method is the same as that in the first embodiment, and thus detailed description thereof is omitted.

In step S804, the CPU 44a calculates the distance from the work vehicle 10 to a virtual line located ahead of the work vehicle 10 in the traveling direction based on the traveling direction of the work vehicle 10 and the virtual line located ahead in the traveling direction. In the example of FIG. 4A, the distance to an intersection with the virtual line 411 located ahead in the traveling direction 402 is calculated.

Here, an example of a method of calculating the distance to the intersection with the virtual line 411 located ahead in the traveling direction 402 of FIG. 4A will be described again with reference to FIG. 6. In FIG. 6, a point O is a current position of the work vehicle 10. A point A corresponds to the marker 401a in FIG. 4A, and a point B corresponds to the marker 401b in FIG. 4A. When the distance to be obtained is X, X is the length of a line OC. Here, since the position coordinates of the point A, the position coordinates of the point B, and the position coordinates (self-position) of the point O are known, the length of the line OA and the length of the line OB can be obtained from these. Thereafter, the distance from the work vehicle 10 to the virtual line 411 located ahead in the traveling direction of the work vehicle 10 is calculated by a procedure similar to the procedure described in the first embodiment.

Other steps are similar to the processing described with reference to FIGS. 5A and 5B.

As described above, in the second embodiment, marker position information indicating position coordinates of a marker is acquired as marker information, and the avoidance operation is performed by calculating a distance from the work vehicle to the virtual line and a time until the work vehicle reaches the virtual line by using the marker position information and self-position information and orientation information of the work vehicle.

As a result, the operation of the work vehicle can be controlled using the marker position information indicating the position coordinates of the marker and the self-position and orientation of the work vehicle.

Third Embodiment

In the first and second embodiments, the control performed on the premise that the arrangement of the markers does not change has been described. However, some or all of the markers defining the work area may be removed, fallen, or stolen, and may thus become undetectable. In the present embodiment, an example in which the autonomous work machine can continue the work even when some or all of the markers arranged in the past are no longer detected will be described.

Specifically, images captured by the method according to the first embodiment or the second embodiment during work are stored in the memory 44c as past captured images (landscape images). Then, when the work is performed again, a past captured image similar to a current captured image that is newly captured is searched and acquired from the memory 44c. Then, markers are detected from the past captured image, the determination of adjacent markers and the setting of a virtual line are performed similarly to the first embodiment and the second embodiment, and the avoidance operation is performed. As described above, by controlling the autonomous work machine using the past captured image similar to the current captured image, the autonomous work machine can continue the work even when some or all of the markers arranged in the past are no longer detected.

Since the system configuration and the configuration of the autonomous work machine are similar to those described in the first embodiment, the description thereof will be omitted.

FIG. 9 is a diagram illustrating a travel example of a work vehicle according to the present embodiment. The work vehicle 10 performs work in a work area defined by markers 901a to 901d and the like (only part of the markers defining the work area is illustrated). The markers 901a to 901d, a tree 911, a tree 912, and a house 913 exist in the traveling direction of the work vehicle 10, and a landscape image including these is acquired as a captured image by the camera unit 11 of the work vehicle 10.

Here, FIG. 10 is a diagram illustrating a search example of a past captured image similar to a current captured image. How an image similar to a current captured image 1001 among past captured images 1011 to 1015 and the like is searched and acquired as the past captured image 1011 is illustrated. Regarding determination of the similarity, it is possible to obtain a histogram of pixel values (for example, luminance values), calculate a matching degree between the histograms of the two, and acquire a past captured image in which the matching degree is a predetermined value or high as an image similar to the current captured image. Note that the method of calculating the matching degree between the images is not limited to this example, and any method may be used. In the illustrated example, the marker 901c is included in the similar past captured image 1011, but the marker 901c is not detected from the current captured image 1001.

In this way, the markers are not always arranged as before when the work is to be started. Therefore, in the present embodiment, the work vehicle 10 is controlled by using a past captured image similar to a current captured image such that the lack of a marker can be addressed.

<Processing>

Next, a procedure of processing performed by the work vehicle 10 according to the present embodiment will be described with reference to flowcharts of FIGS. 11A and 11B. The work vehicle 10 according to the present embodiment sets a virtual line between markers and performs control so that the work vehicle 10 does not deviate to a region beyond the virtual line. At this point, the processing is performed by using the past captured image similar to the current captured image.

In step S1101, the CPU 44a acquires a stereo image (captured image) captured by the camera unit 11.

In step S1102, the CPU 44a searches the memory 44c for and specifies a past captured image (for example, one part of a stereo image captured in the past) similar to a current captured image (for example, one part of the stereo image) acquired in step S1101.

In step S1103, the CPU 44a detects a marker from the past captured image (landscape image) specified in step S1101. A method of detecting a marker from an image is similar to that in the first embodiment.

In step S1104, the CPU 44a determines whether or not a marker has been detected from the past captured image (landscape image) specified in step S1101. In the case where a marker has been detected, the process proceeds to step S1105. In contrast, in the case where a marker has not been detected, the process proceeds to step S1115.

In step S1105, the CPU 44a acquires distance information to the detected marker. In this step, first, the CPU 44a acquires the gravity center position of the marker in the image similarly to steps S506 and S507 of the first embodiment. Next, the CPU 44a acquires a distance image based on the specified past captured image (stereo image), and acquires distance information from the work vehicle 10 to the gravity center position of the marker. Here, it is assumed that the memory 44c stores a past captured image, and another past captured image having parallax with respect to the past captured image in association with each other. Therefore, the distance image can be acquired. Note that the position of the marker is not limited to the gravity center position of the marker similarly to the first embodiment.

Each process of steps S1106 to S1115 is similar to each process of steps S508 to S517 of the first embodiment. Accordingly, the series of processing in FIGS. 11A and 11B are finished.

As described above, in the present embodiment, a past captured image (landscape image) acquired in a past work is stored. Then, a past captured image similar to a current captured image is specified, a marker is detected from the specified past captured image, and distance information to the marker is acquired using the distance image. Then, a virtual line is set between markers on the basis of the distance information, and the work vehicle 10 is controlled so as not to deviate to a region beyond than the virtual line.

In this manner, the autonomous work machine can continue the work even when some or all of the markers arranged in the past are no longer detected from the current captured image. That is, even if some or all of the markers are removed, fallen, or stolen, the work can be continued in the initially defined work area.

[Modifications]

To be noted, although an example of calculating the distance information to the marker from the past captured image (stereo image) has been described in the third embodiment, it is not always necessary to calculate the distance information. For example, a past captured image and distance information calculated in the past to a marker included in the image may be stored in the memory 44c in association with each other, and the distance information to the marker may be read and acquired from the memory 44c.

Figure 12:
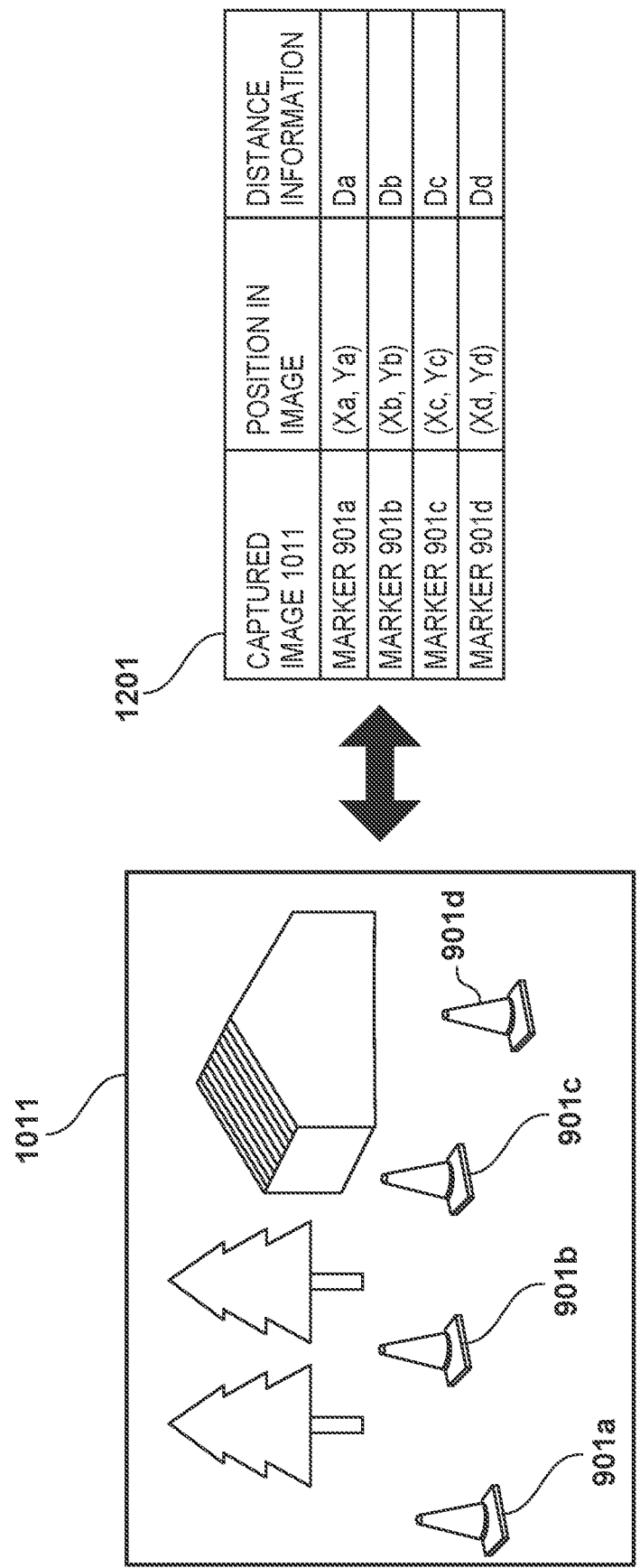
FIG. 12 is a diagram illustrating an example of association between a captured image and position and distance information of a marker according to a fourth embodiment.

For example, as illustrated in FIG. 12, it is assumed that four markers have been detected from the past captured image 1011 in the past, and the position of each marker in the image calculated in the past (for example, the gravity center position of the marker) and the distance information to the marker are stored in association with the past captured image 1011 in the form of a table 1201 or the like. In the table 1201, the markers 901a to 901d are detected from the captured image 1011. In addition, the position of the marker 901a in the image is stored as (Xa, Ya), and distance information to the marker 901a is stored as Da. Similarly, the position of the marker 901b in the image is stored as (Xb, Yb), and distance information to the marker 901b is stored as db. The position of the marker 901c in the image is stored as (Xc, Yc), and distance information to the marker 901c is stored as Dc. The position of the marker 901d in the image is stored as (Xd, Yd), and distance information to the marker 901d is stored as Dd.

The work vehicle 10 specifies a past captured image similar to the current captured image, and determines whether there is a marker associated with the captured image with reference to the table, thereby performing marker detection processing in steps S1103 and S1104. Then, the processing for acquiring the distance information to the marker in step S1105 is performed with reference to the table for the marker associated with the captured image.

In this manner, the distance information may be acquired with reference to a table stored in advance without calculating the distance information to the marker in the image each time using the captured image (stereo image). As a result, the processing time can be shortened.

Furthermore, although it has been described in the third embodiment that a landscape image is stored, the landscape can change depending on the season (spring, summer, autumn, and winter), the month, the time zone, and the weather. For example, there is a possibility that a landscape image stored in a work area with snow piled up in winter is not similar to a current captured image captured in a work area with flourishing greenery in summer. If the state changes extremely, a past captured image similar to the current captured image may not be able to be specified. Therefore, the data to be stored as past captured images may be acquired and stored in the memory 44c periodically, for example, for each season, for each month, for each period of time (for example, evening or morning), for each weather (for example, good weather or rainy weather), or the like. Then, for example, a similar captured image may be specified from the past captured images stored in the same season as the season in which the current captured image is captured.

Alternatively, since the amount of data to be stored becomes enormous if all situations can be handled, the data may be periodically updated. For example, in summer, images captured in spring may be discarded, the markers may be rearranged, and captured image for summer to be stored in the memory 44c may be reacquired.

Fourth Embodiment

In the third embodiment, an example has been described in which the current captured image is not used, a past captured image similar to the current captured image is specified, and the work vehicle 10 is controlled based on the past captured image. In the fourth embodiment, an example will be described in which the case of controlling the work vehicle 10 on the basis of the current captured image and the case of controlling the work vehicle 10 on the basis of the past captured image are switched according to the situation.

Since it is not always possible to acquire a past captured image completely matching the current captured image, the similar past captured image is specified. However, as the deviation from the current captured image is larger, it becomes more difficult to perform control accurately reflecting the current situation.

Meanwhile, it is possible that a marker in the past captured image is no longer present in the current captured image. In that case, since more accurate control can be performed using the current captured image reflecting the current situation, control using the current captured image is performed instead of control using the past captured image.

Since the system configuration and the configuration of the autonomous work machine are similar to those described in the first embodiment, the description thereof will be omitted.

<Processing>

Next, a procedure of processing performed by the work vehicle 10 according to the present embodiment will be described with reference to flowcharts of FIGS. 13A and 13B. The work vehicle 10 according to the present embodiment sets a virtual line between markers and performs control so that the work vehicle 10 does not deviate to a region beyond the virtual line. At that time, whether to perform control based on the current captured image or perform control based on a past captured image similar to the current image is switched according to whether or not a marker is missing.

Each process of steps S1101 and S1102 is similar to each process of steps S1101 and S1102 of the third embodiment.

In step S1301, the CPU 44a detects a marker in the current captured image acquired in step S1101, and also detects a marker in the past captured image specified in step S1102.

In step S1302, the CPU 44a determines whether or not one or more markers have been detected from the past captured image. In the case where one or more markers have been detected, the process proceeds to step S1303. In contrast, when no marker has been detected from the past captured image, no marker should be detected from the current captured image, and thus the process proceeds to step S1115.

In step S1303, the CPU 44a compares the current captured image with the past captured image, and determines whether or not one or more markers are missing in the current captured image. In the case where one or more markers are missing, the process proceeds to step S1304. In contrast, in the case where one or more markers are not missing, the process proceeds to step S1305.

In step S1304, since a marker is missing, the CPU 44a determines to perform control using a past captured image similar to the current captured image.

In step S1305, since no marker is missing, the CPU 44a determines to perform control using the current captured image. If no marker is missing, the accuracy can be improved by using the current captured image in which the current situation is more accurately reflected.

Each process of steps S1105 to S1115 is similar to each process of steps S1105 to S1115 of the third embodiment. However, depending on the determination result in step S1303, whether the image to be used in step S1105 is the current captured image or a past captured image similar to the current captured image varies. Accordingly, the series of processing in FIGS. 13A and 13B are finished.

As described above, in the present embodiment, past captured images acquired in a past work are stored. Then, a past captured image similar to the current captured image is specified. Next, a marker is detected from each captured image, and whether or not a marker is missing in the current captured image is determined. According to the determination result, whether to perform control based on the current captured image or perform control based on a past captured image similar to the current captured image is switched.

In this manner, the autonomous work machine can continue the work even when some or all of the markers arranged in the past are no longer detected from the current captured image. That is, even if some or all of the markers are removed, fallen, or stolen, the work can be continued in the initially defined work area. Further, in the case where no marker is missing, control based on the current captured image is performed, and therefore the accuracy can be improved.

Note that, also in the present embodiment, in the case where control based on a past captured image is performed, a table can be used as in the modification of the third embodiment.

Fifth Embodiment

In the third embodiment, an example has been described in which the current captured image is not used, a past captured image similar to the current captured image is specified, and the work vehicle 10 is controlled based on the past captured image. In the present embodiment, an example will be described in which distance information from the work vehicle 10 to the marker is acquired with reference to map information while using a past captured image.

Specifically, at the time of past work, captured images and the position and orientation of the work vehicle 10 are stored in advance in association with each other. The position and orientation of the work vehicle 10 can be measured using, for example, the GPS sensor 48 and the orientation sensor 46. Alternatively, the measurement may be performed by using odometry, an inertial measurement unit (IMU), or the like. In addition, map information including an arrangement position of a marker is stored in advance. Then, at the time of the current work, a past captured image similar to the current captured image is specified, a marker is detected from the past captured image, and information on the position and direction of the work vehicle 10 associated with the past captured image is acquired. Then, which marker is the detected marker is determined based on the information on the position and orientation of the work vehicle 10 and the map information. If which is the marker is specified, distance information from the work vehicle 10 to the marker can be acquired by using the map information.

Figure 14:
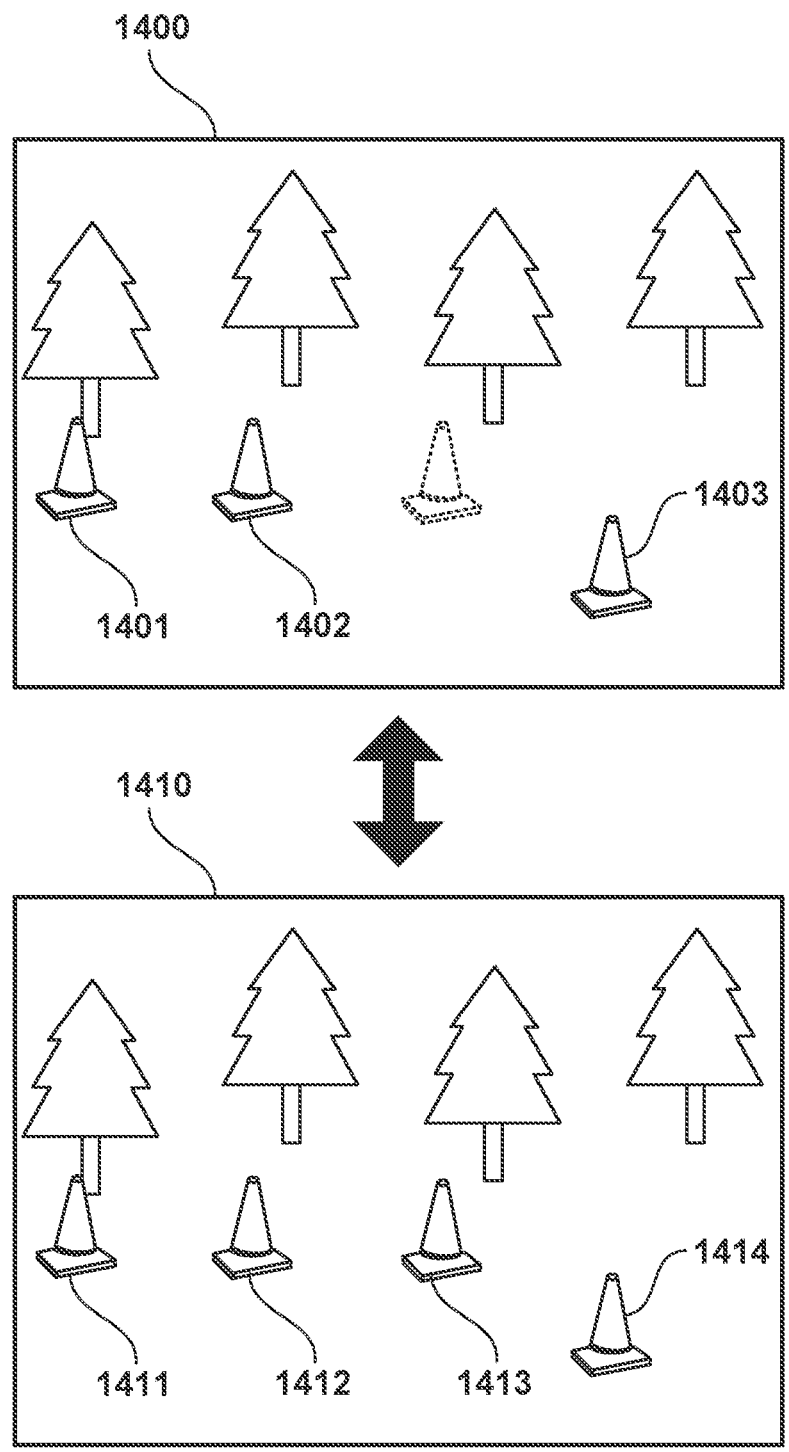
FIG. 14 is a diagram illustrating an example of a current captured image and a past captured image similar to the current captured image according to a fifth embodiment.

For example, as illustrated in FIG. 14, it is assumed that a past captured image 1410 similar to a current captured image 1400 is specified, and four markers 1401 to 1404 are detected from the past captured image 1400. In the illustrated example, the three markers 1401 to 1403 are detected from the current captured image 1400, but the four markers 1401 to 1404 are detected from the past captured image 1410. That is, this is a case where a marker 1413 that has existed before is no longer detected for some reason.

Figure 15:
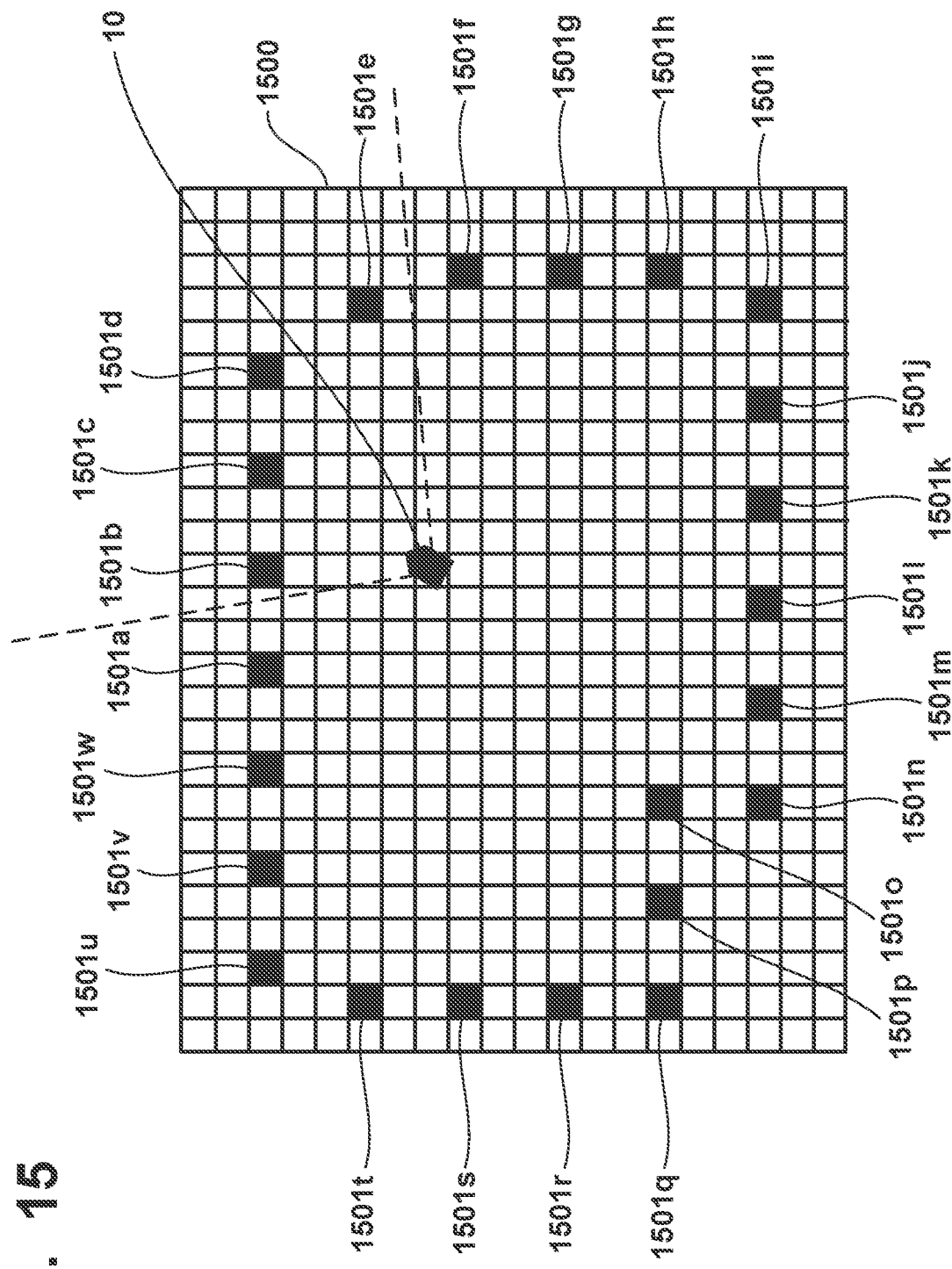
FIG. 15 is a diagram illustrating an example of map information including arrangement positions of markers according to the fifth embodiment.

Then, as a result of acquiring the information on the position and orientation of the work vehicle 10 associated with the captured image 1410, it is assumed that the position and orientation of the work vehicle 10 are as illustrated in FIG. 15. In FIG. 15, position information (position coordinates) of markers 1501a to 1501w arranged to define the work area is known. In consideration of the field angle range of the work vehicle 10, it can be determined that the markers 1501b, 1501c, 1501d, and 1501e in the map information stored in advance correspond to the markers 1411 to 1414. Since the determined positions of the markers 1501b, 1501c, 1501d, and 1501e on the map are known, distance information between the work vehicle 10 and these markers can be acquired by calculating distance between coordinates.

The position information (position coordinates) of the markers 1501a to 1501w can be acquired by calculating distance information of the markers detected from the captured image on the basis of the stereo image and plotting the distance information on the map while the work vehicle 10 is working. The map information acquired in advance is stored in the memory 44c, and the map information is read and used at the time of the current work.

<Processing>

Figure 16A:
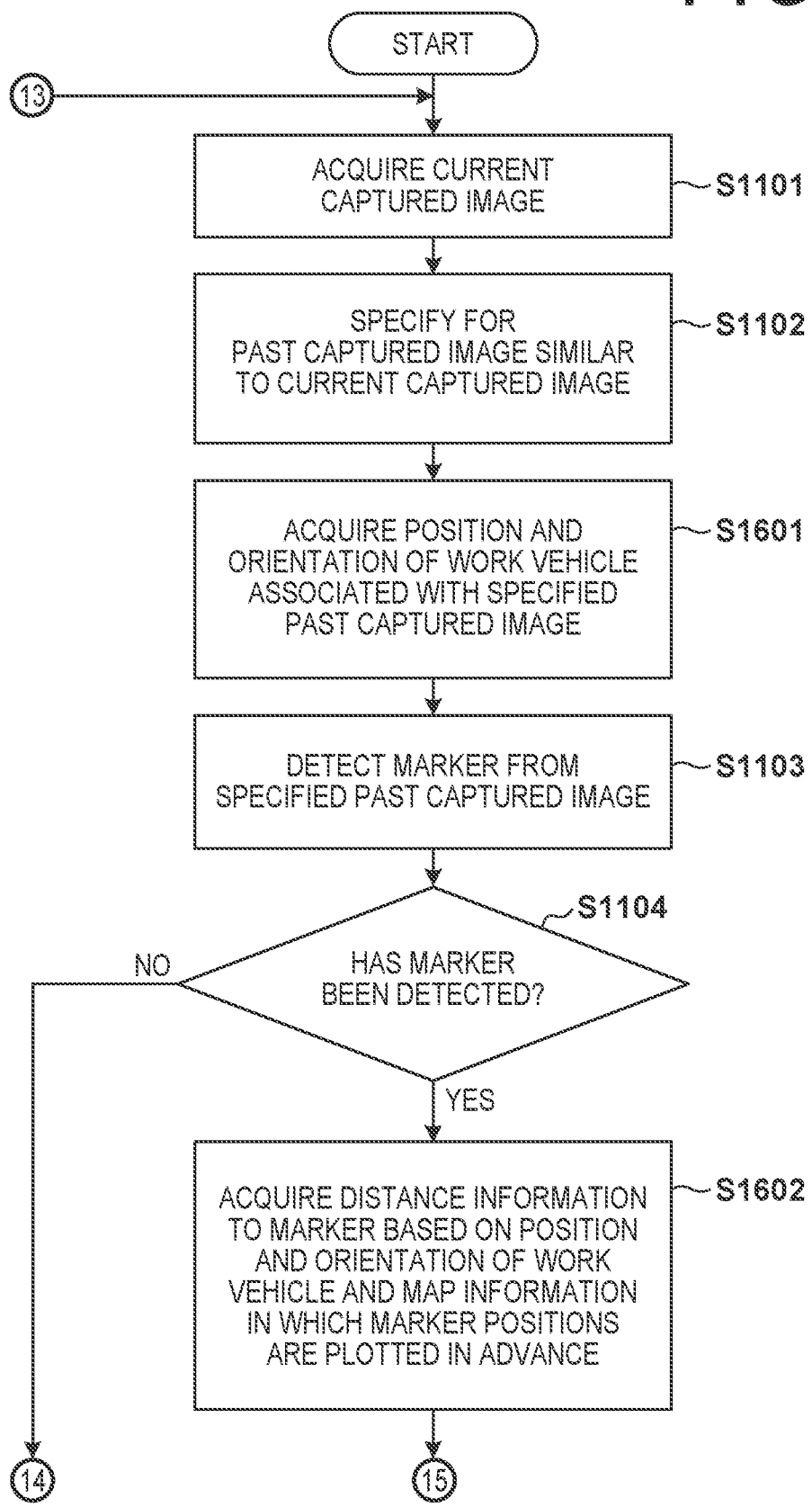
FIG. 16A is a flowchart illustrating a procedure of processing performed by an autonomous work machine according to the fifth embodiment.
Figure 16B:
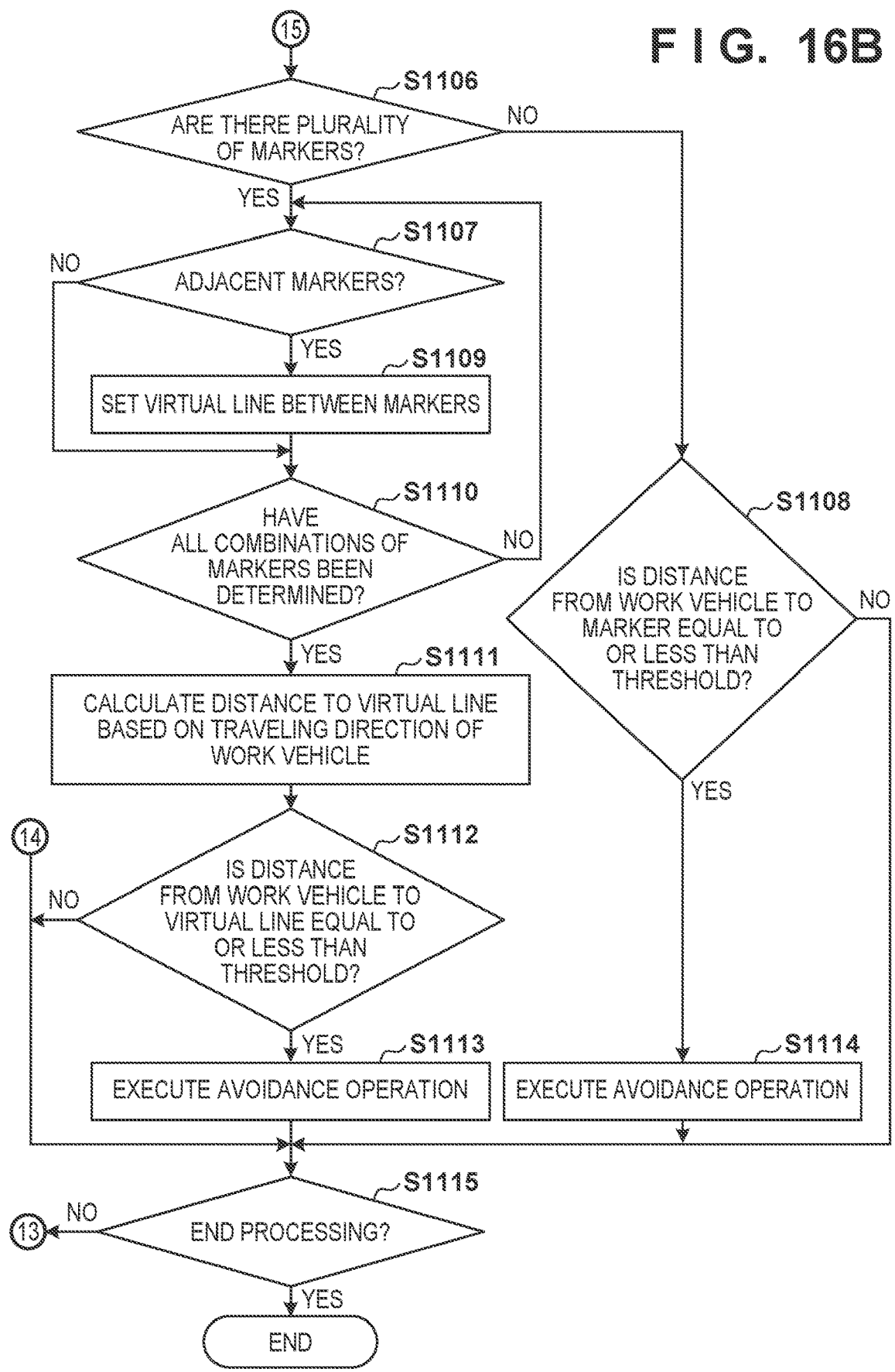
FIG. 16B is a flowchart illustrating a procedure of processing performed by the autonomous work machine according to the fifth embodiment.

Next, a procedure of processing performed by the work vehicle 10 according to the present embodiment will be described with reference to flowcharts of FIGS. 16A and 16B. The work vehicle 10 according to the present embodiment sets a virtual line between markers and performs control so that the work vehicle 10 does not deviate to a region beyond the virtual line.

Each process of steps S1101 to S1104 is similar to each process of steps S1101 to S1104 of FIG. 11A.

In step S1601, the CPU 44a acquires, from the memory 44c, information indicating the position and orientation of the work vehicle 10 stored in association with the past captured image specified in step S1102.

In step S1602, the CPU 44a acquires distance information to the detected marker based on the information indicating the position and orientation of the work vehicle 10 acquired in step S1601 and map information in which marker positions are plotted in advance and the marker positions are known.

Figure 11B:
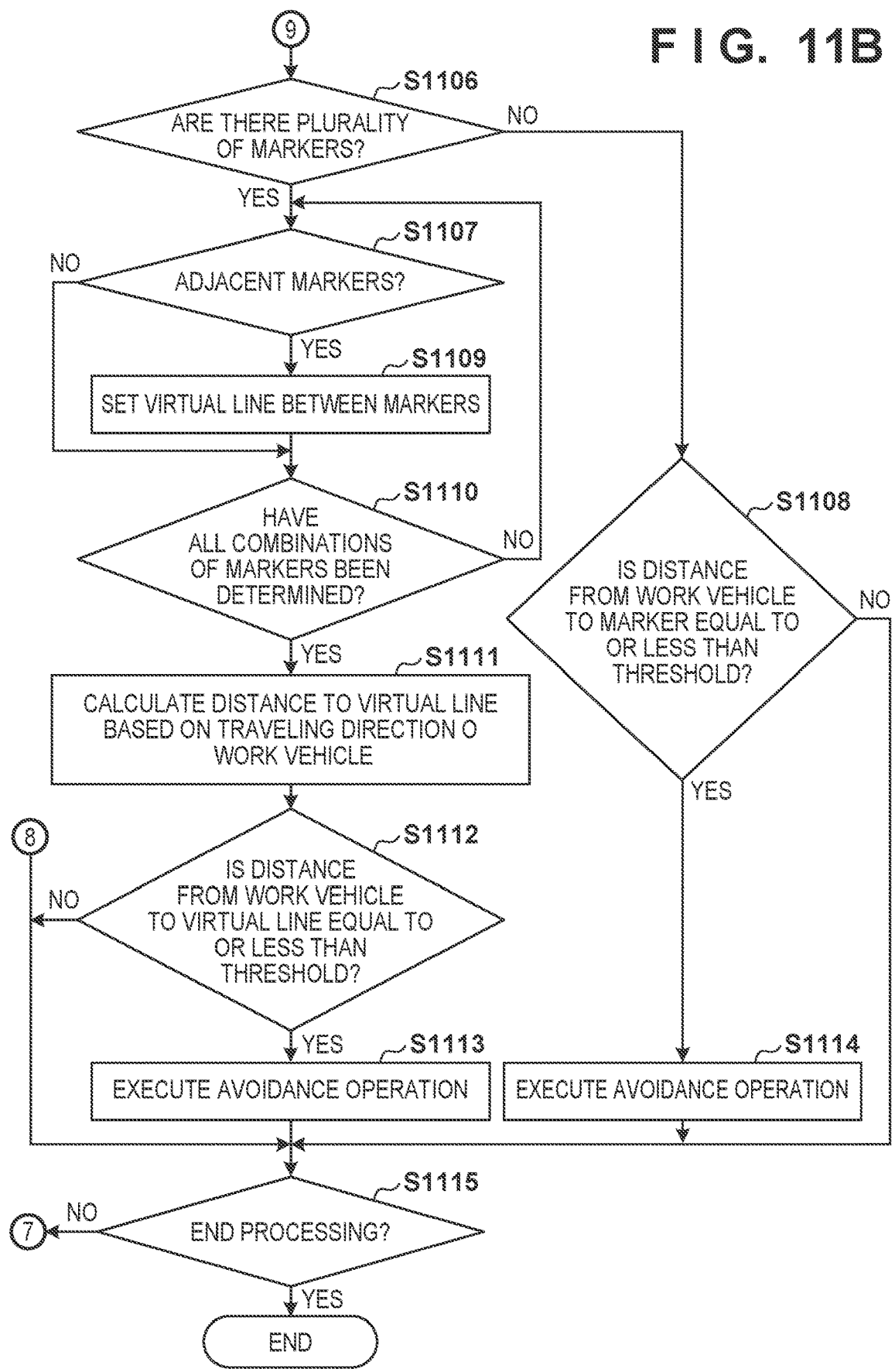
FIG. 11B is a flowchart illustrating a procedure of processing performed by the autonomous work machine according to the third embodiment.

Each process of steps S1106 to S1115 is similar to each process of steps S1106 to S1115 of FIG. 11B. Accordingly, the series of processing in FIGS. 16A and 16B are finished.

As described above, in the present embodiment, past captured images acquired in the past work and the position and direction of the work vehicle 10 at the time of the imaging are stored in the memory 44c in association with each other. In addition, map information including arrangement information of markers is stored in the memory 44c in advance. Then, at the time of the current imaging, a past captured image similar to the current captured image is specified, and information on the position and orientation of the work vehicle 10 associated with the past captured image is acquired. In addition, a marker is detected from the past captured image similar to the current captured image. Further, which marker in the map the detected marker corresponds to is determined based on the acquired position and orientation of the work vehicle 10 and the map information. Then, distance information to the marker is acquired from position coordinates of the marker on the map and position coordinates of the work vehicle 10.

In this manner, the autonomous work machine can continue the work even when some or all of the markers arranged in the past are no longer detected from the current captured image. That is, even if some or all of the markers are removed, fallen, or stolen, the work can be continued in the initially defined work area. In addition, since the distance information to the marker is acquired from the arrangement information of the marker and the position information of the work vehicle 10, it is not necessary to acquire a distance image and calculate the distance information.

Sixth Embodiment

In the fourth embodiment, an example in which whether to perform control based on the current captured image or perform control based on a past captured image similar to the current image is switched according to whether or not a marker is missing has been described. In the present embodiment, an example in which whether to perform control based on the current captured image or perform control based on both the current captured image and a past captured image similar to the current image is switched according to whether or not a marker is missing will be described.

Specifically, the current captured image is compared with a past captured image similar to the current captured image to determine whether or not any marker is missing, and when a marker is missing, the marker in the past captured image missing in the current captured image is arranged as a virtual marker at the corresponding position in the current captured image. Then, distance information to each marker is acquired on the basis of the marker detected from the current captured image and the virtual marker arranged in the current captured image, and a virtual line is set between the markers.

The use of the information of the marker detected from the current captured image enables more highly accurate control reflecting the current situation, but the lack of the marker may cause deviation from the work area. Therefore, for the missing marker, information on the marker from the similar past captured image is used. As a result, the marker information of the past captured image can be used together for the lack while using the marker information of the current captured image as much as possible. Therefore, it is possible to realize highly accurate control reflecting the current situation as much as possible while suppressing the deviation from the work area.

Since the system configuration and the configuration of the autonomous work machine are similar to those described in the first embodiment, the description thereof will be omitted.

Figure 17:
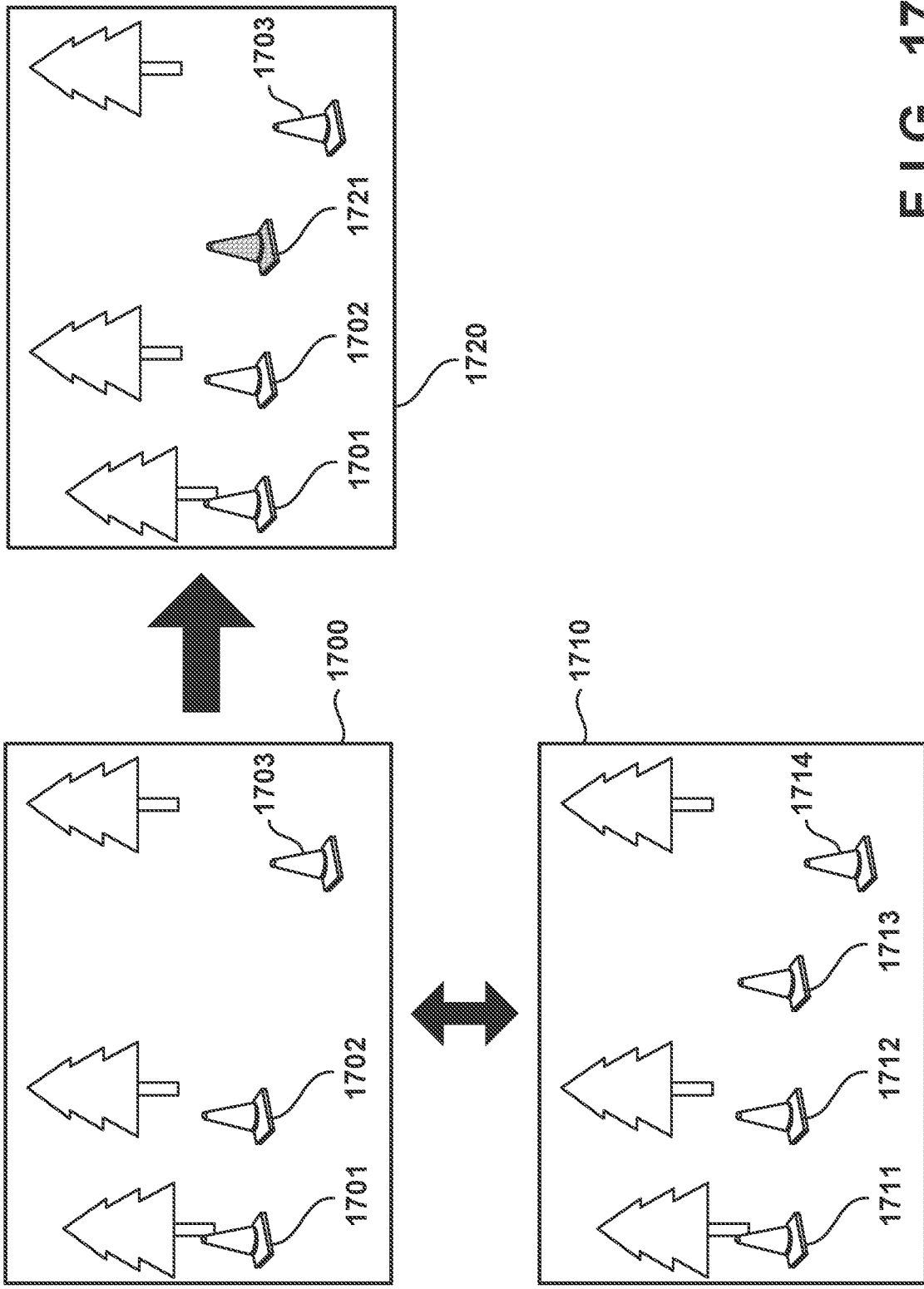
FIG. 17 is a diagram illustrating an example of superimposed arrangement of a virtual marker according to a sixth embodiment.

Here, FIG. 17 is a diagram illustrating an example of superimposed arrangement of a virtual marker according to the present embodiment. Reference numeral 1700 denotes a current captured image. Three markers 1701 to 1703 are detected from the current captured image 1700. Meanwhile, as a result of specifying a past captured image 1710 similar to the current captured image 1700 and detecting markers, four markers of markers 1711 to 1714 are detected. When the current captured image 1700 is compared with the past captured image 1710 similar to the current captured image 1700, it can be determined that a marker that should correspond to the marker 1713 is missing in the current captured image 1700. Therefore, a corrected image 1720 is acquired by arranging a virtual marker 1721 at a position in the current image 1700 corresponding to an in-image position of the marker 1713 detected from the past captured image 1710.

The work vehicle 10 is controlled using the corrected image 1720. Regarding the markers 1701 to 1703, for example, the distance information of each marker can be acquired from the current image 1700 or the corrected image 1720 by the method described in the first embodiment. In addition, for the virtual marker 1721, for example, the distance information of the virtual marker 1721 can be acquired by acquiring the distance information of the marker 1713 from the past captured image 1710 by the method described in the third embodiment. Then, a virtual line connecting markers (adjacent markers) included in the corrected image 1720 is set using the acquired distance information of the markers.

<Processing>

Figure 18A:
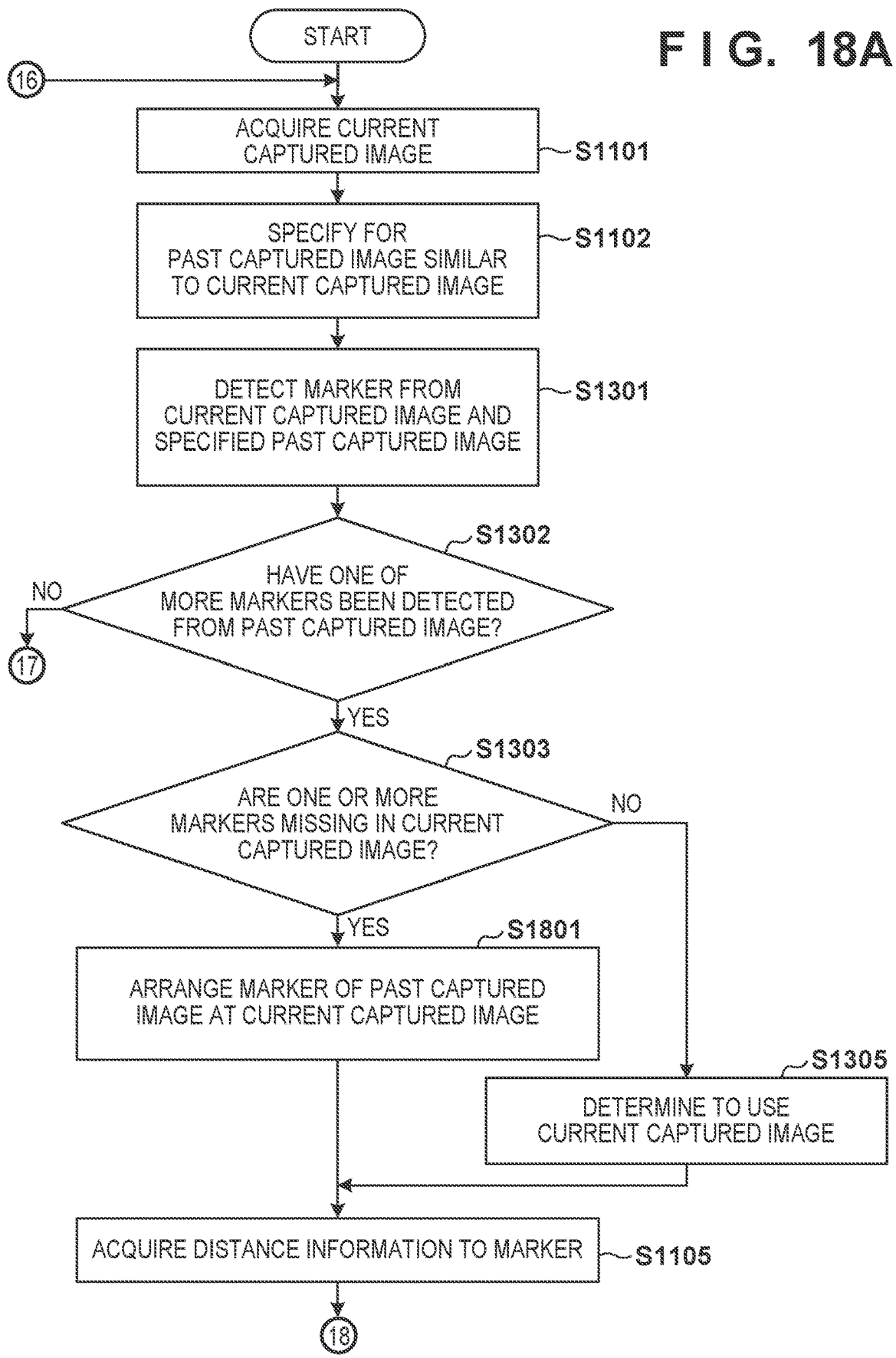
FIG. 18A is a flowchart illustrating a procedure of processing performed by an autonomous work machine according to the sixth embodiment.
Figure 18B:
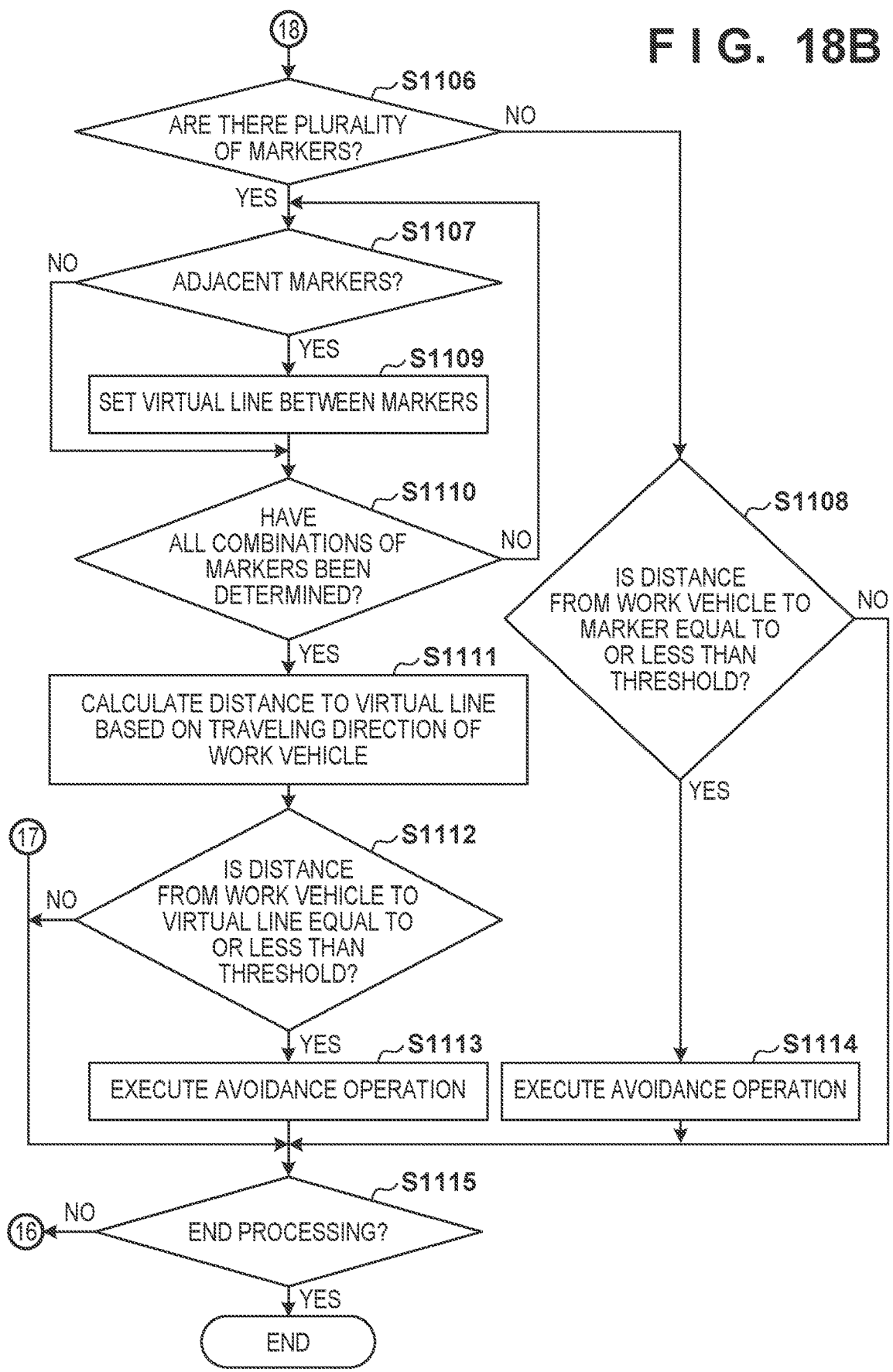
FIG. 18B is a flowchart illustrating a procedure of processing performed by the autonomous work machine according to the sixth embodiment.

Next, a procedure of processing performed by the work vehicle 10 according to the present embodiment will be described with reference to flowcharts of FIGS. 18A and 18B. The work vehicle 10 according to the present embodiment sets a virtual line between markers and performs control so that the work vehicle 10 does not deviate to a region beyond the virtual line. At this time, whether to perform control based on the current captured image or perform control based on both the current captured image and a past captured image similar to the current image is switched according to whether or not a marker is missing.

Figure 13A:
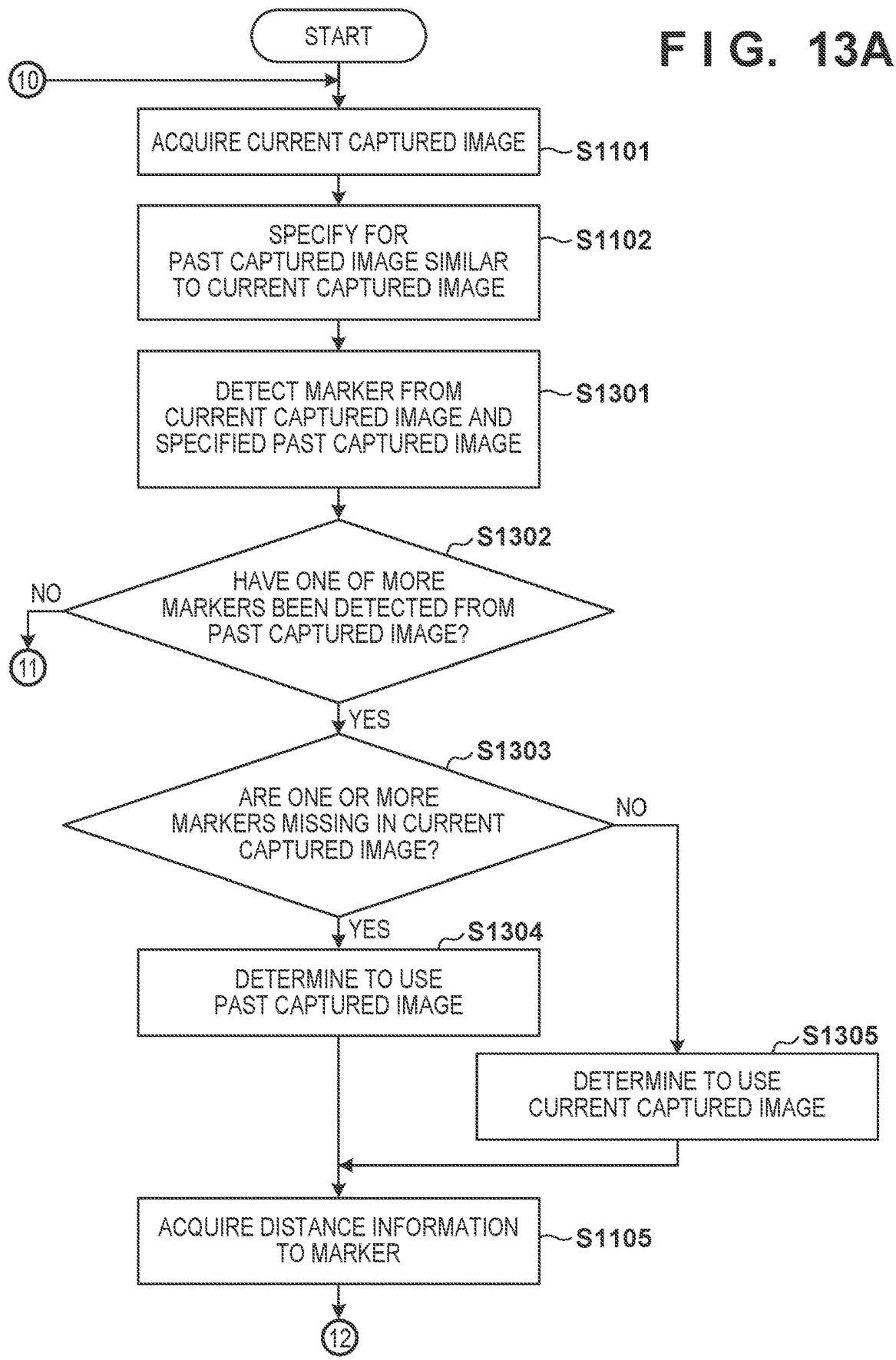
FIG. 13A is a flowchart illustrating a procedure of processing performed by an autonomous work machine according to a fourth embodiment.

Each process of steps S1101, S1102, S1302, S1303, and S1305 is similar to each corresponding process of FIG. 13A.

In step S1801, the CPU 44a specifies a marker that is missing in the current captured image by using the past captured image specified in step S1102 that is similar to the current captured image. Then, a virtual marker corresponding to the marker is arranged at a position in the current captured image corresponding to the position of the marker in the specified past captured image, and thus a corrected image is generated.

Figure 13B:
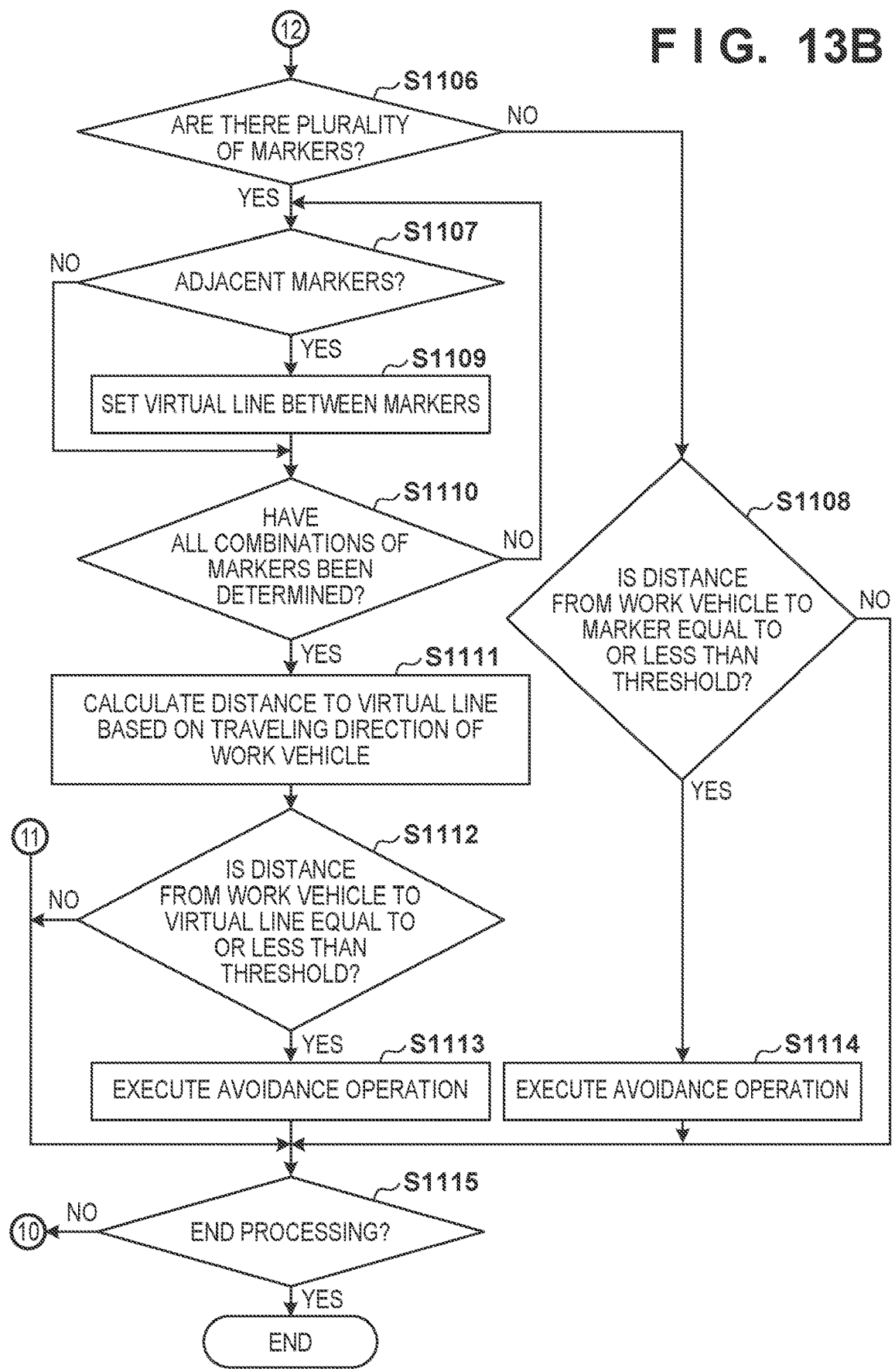
FIG. 13B is a flowchart illustrating a procedure of processing performed by the autonomous work machine according to the fourth embodiment.

Each process of steps S1105 to S1115 is similar to each corresponding process of FIGS. 13A and 13B. However, in the case where the processing has proceeded to step S1105 through step S1801, the distance information of each of the marker detected from the current captured image and the virtual marker superimposed and arranged on the current captured image is acquired. The distance information of the marker detected from the current captured image can be acquired by, for example, the method described in the first embodiment. In addition, regarding the distance information of the virtual marker, the distance information of the corresponding marker in the past captured image similar to the current captured image can be acquired by, for example, the method described in the third embodiment and used as the distance information of the virtual marker. In addition, also in the processing in and after step S1106, the work vehicle 10 can perform the work without deviating from the work area by performing the processing on the marker and the virtual marker in the current captured image.

As described above, in the present embodiment, whether to perform control based on the current captured image or perform control based on both the current captured image and a past captured image similar to the current image is switched according to whether or not a marker is missing will be described. Then, in the case where a marker is missing, the marker missing in the current captured image is specified from the past captured image, and a virtual marker corresponding to the marker is superimposed and arranged at a corresponding position in the current captured image. Furthermore, a virtual line is set on the basis of the distance information of the marker detected from the current captured image and the distance information of the virtual marker, and control is performed so as not to deviate to a region beyond the virtual line.

As described above, by using the information of a marker of a similar past captured image for the missing marker, the marker information of the current captured image can be used as much as possible, and the marker information of the past captured image can be used together for the lack. Therefore, it is possible to realize highly accurate control reflecting the current situation as much as possible while suppressing the deviation from the work area.

[Modifications]

To be noted, in the sixth embodiment, a virtual line connecting an actual marker (real marker) and a virtual marker in the current captured image may be set. In step S1112, when determining whether or not the distance to the virtual line is equal to or less than the threshold, a different threshold may be applied depending on whether the virtual line connects real markers, whether the virtual line connects virtual markers, and whether the virtual line connects a real marker and a virtual marker.

For example, a threshold for a virtual line connecting real markers is set as a first threshold value, a threshold for a virtual line connecting a real marker and a virtual marker is set as a second threshold, and a threshold for a virtual line connecting virtual markers is set as a third threshold value. In this case, for example, the second threshold may be larger than the first threshold. Since the accuracy of the virtual line connecting a real marker and a virtual marker is assumed to be lower than the accuracy of the virtual line connecting real markers, it is possible to suppress the deviation from the work area by performing the avoidance operation before approaching the virtual line much.

Similarly, the third threshold may be larger than the first threshold. Since the accuracy of the virtual line connecting virtual markers is assumed to be lower than the accuracy of the virtual line connecting real markers, it is possible to suppress the deviation from the work area by performing the avoidance operation before approaching the virtual line much.

In addition, since it can be assumed that the accuracy of the virtual line decreases as the degree of using the past information increases, the third threshold>the second threshold>the first threshold may be set.

In the embodiments described above, the lawn mower has been described as an example of the autonomous work machine, but the autonomous work machine is not limited to the lawn mower. For example, the present invention can also be applied to other types of autonomous work machines such as an autonomous snow removing machines, golf ball collectors, outboard motors, and the like.

In addition, in each of the embodiments described above, the processing of other embodiments may be applied or used in combination. Furthermore, although markers having a shape like a cone has been described as an example in each embodiment described above, the type of marker is not limited to the illustrated example. For example, the marker may be a thin flat plate-shaped marker that can be attached to a wall surface of a building or the like.

In addition, although the work vehicle has been described as an autonomous work machine that controls itself in each embodiment described above, for example, an external control device different from the work vehicle, such as a server, may have a function of performing the processing of the embodiments described above. In this case, some or all functions of the work vehicle described in each embodiment described above can be realized on the control device by the control device acquiring information of past captured images captured by the camera unit of the work vehicle or the like from the work vehicle by communication and transmitting various control information to the work vehicle.

<Summary of Embodiments>

1. The autonomous work machine (for example, 10) of the embodiments described above is
   an autonomous work machine that works in a work area and includes:
   a storage unit (for example, 44c) that stores past captured images (for example, 1011 to 1015) including one or more markers (for example, 901a to 901d) arranged to define the work area;
   a specifying unit (for example, 44a) that specifies a past captured image (for example, 1011) stored in the storage unit and similar to a current captured image (for example, 1001) captured by an image capturing unit (for example, 11); and
   a control unit (for example, 44a) that controls the autonomous work machine based on the past captured image specified by the specifying unit.

According to this embodiment, even when some or all of the markers arranged to define the work area are lost, the work can be continued because information of the past in which a marker has been previously arranged is used.

2. In the autonomous work machine (for example, 10) of the embodiments described above,
   a detection unit (for example, 44a) that detects a marker in the past captured image specified by the specifying unit; and
   a setting unit (for example, 44a) that, in a case where a plurality of markers have been detected by the detection unit, sets a virtual line connecting the plurality of markers, are further provided, and
   the control unit controls the autonomous work machine such that the autonomous work machine does not deviate to a region beyond the virtual line set by the setting unit.

According to this embodiment, it is possible to cause the autonomous work machine to work without deviating from the work area.

3. In the autonomous work machine (for example, 10) of the embodiments described above,
   the storage unit stores a marker included in the past captured image and distance information from the autonomous work machine to the marker in association (for example, 1201) with each other, and
   the setting unit sets the virtual line based on distance information of each of the plurality of markers detected by the detection unit.

According to this embodiment, it becomes not necessary to store a stereo image as a past captured image, and acquisition of a distance image becomes also unnecessary. That is, the amount of data to be stored can be reduced, and the processing time can be shortened because it is not necessary to calculate the distance information.

4. In the autonomous work machine (for example, 10) of the embodiments described above, the storage unit stores the past captured image and another past captured image having parallax with respect to the past captured image in association with each other, and the setting unit calculates, based on the past captured image and the other past captured image having parallax with respect to the past captured image, distance information from the autonomous work machine to each of the plurality of markers detected by the detection unit, and sets the virtual line based on the calculated distance information.

According to this embodiment, since the distance information to the marker can be calculated from the past captured image (stereo image), it is sufficient to store only the captured image (stereo image), and management becomes easy.

5. In the autonomous work machine (for example, 10) of the embodiments described above, a detection unit (for example, 44a) configured to detect a marker in the current captured image and the past captured image is further provided, and the control unit determines (for example, S1303) whether or not a marker is missing in the current captured image with respect to the past captured image based on a detection result from the current captured image and a detection result from a past captured image similar to the current captured image, and, when it is determined that a marker is missing, controls the autonomous work machine based on the past captured image specified by the specifying unit.

According to this embodiment, when a marker is missing in the current captured image, control based on a past captured image having no missing marker can be performed, and thus when no marker is missing in the current captured image, the control based on the current captured image can be performed. Therefore, in the case where no marker is missing in the current captured image, the autonomous work machine is controlled by detecting markers from the current captured image, and thus accurate control reflecting the current situation can be performed.

6. In the autonomous work machine (for example, 10) of the embodiments described above, the storage unit stores the past captured image and information of a position and orientation of the autonomous work machine at a time of capturing the past captured image in association with each other, the autonomous work machine includes:

an acquisition unit (for example, 44a and S1601) that acquires the information on the position and orientation of the autonomous work machine corresponding to the past captured image specified by the specifying unit; and a distance information acquisition unit (for example, 44a and S1602) that acquires, based on the information on the position and orientation of the autonomous work machine and map information including an arrangement position of the marker, distance information to the marker detected by the detection unit from the past captured image specified by the specifying unit, are further provided, and when a plurality of markers have been detected by the detection unit, the setting unit sets the virtual line based on the distance information acquired for each of the plurality of markers.

According to this embodiment, it becomes not necessary to store a stereo image of the past, and acquisition of a distance image becomes also unnecessary.

7. In the autonomous work machine (for example, 10) of the embodiments described above, the control unit stops, moves backward, or turns the autonomous work machine in a case where a distance from the autonomous work machine to the virtual line becomes equal to or less than a threshold.

According to this embodiment, it is possible to prevent the autonomous work machine from deviating to the region beyond the virtual line.

8. In the autonomous work machine (for example, 10) of the embodiments described above, an update unit (for example, 44a) that updates information stored in the storage unit is further provided, and the update unit updates the past captured image based on a captured image including the one or more markers captured by the image capturing unit.

According to this embodiment, in the case where, for example, the past captured image to be used for the processing has become old, update to a captured image in a state closer to the current situation can be performed. Therefore, it is possible to suppress a decrease in processing accuracy.

9. In the autonomous work machine (for example, 10) of the embodiments described above, the update unit periodically updates information of the past captured image.

According to this embodiment, since the past captured image used for the processing is periodically updated, it is possible to suppress a decrease in processing accuracy.

10. In the autonomous work machine (for example, 10) of the embodiments described above, the update unit updates information of the past captured image for each season or each month.

According to this embodiment, it is possible to reflect a change in the state of the work area according to a change in season or month. For example, it is possible to use an appropriate past captured image reflecting a change in the landscape according to a season, such as autumn leaves and winter snow, for processing, and to suppress a decrease in processing accuracy.

11. In the autonomous work machine (for example, 10) of the embodiments described above, a detection unit (for example, 44a) that detects a marker in the current captured image and the past captured image; and a setting unit (for example, 44a) that sets a virtual line connecting markers, are further provided, the control unit determines whether or not a marker is missing in the current captured image with respect to the past captured image based on a detection result from the current captured image and a detection result from the past captured image similar to the current captured image, and, in a case where it has been determined that a marker is missing, superimposes (for example, S1801), on the current captured image and as a virtual marker, a corresponding marker in the past captured image specified by the specifying unit, the setting unit sets the virtual line based on distance information of each of a marker detected from the current captured image and the virtual marker superimposed and arranged on the current captured image, and the control unit controls the autonomous work machine so that the autonomous work machine does not deviate to a region beyond the virtual line set by the setting unit.

According to this embodiment, by using the information of a marker of a similar past captured image for the missing marker, the marker information of the current captured image can be used as much as possible, and the marker information of the past captured image can be used together for the lack. Therefore, it is possible to realize highly accurate control reflecting the current situation as much as possible while suppressing the deviation from the work area.

12. In the autonomous work machine (for example, 10) of the embodiments described above, the control unit stops, moves backward, or turns the autonomous work machine when a distance from the autonomous work machine to a virtual line connecting markers detected from the current captured image becomes equal to or less than a first threshold, and stops, moves backward, or turns the autonomous work machine when a distance from the autonomous work machine to a virtual line connecting a marker detected from the current captured image and the virtual marker is equal to or less than a second threshold larger than the first threshold.

According to this embodiment, it is possible to realize appropriate control according to the reliability of the virtual line.

13. The control device (for example, server) of the embodiments described above, is a control device that controls a work machine (for example, 10) that works in a work area, and includes:

a storage unit that stores past captured images including one or more markers arranged to define the work area, an acquisition unit that acquires a current captured image captured by an image capturing unit;

a specifying unit that specifies a past captured image stored in the storage unit and similar to the current captured image; and a control unit that controls the work machine based on the past captured image specified by the specifying unit.

According to this embodiment, even when some or all of the markers arranged to define the work area are lost, the work can be continued because information of the past in which a marker has been previously arranged is used. Furthermore, the work of the work machine can be continued using an external control device such as a server that remotely controls the work machine.

14. The control method for the autonomous work machine (for example, 10) of the embodiments described above is a control method for an autonomous work machine that works in a work area and includes a storage unit (for example, 44c) that stores past captured images including one or more markers (for example, 901a to 901d) arranged to define the work area, and includes:

a specifying step (for example, S1102) of specifying a past captured image (for example, 1011) stored in the storage unit and similar to a current captured image (for example, 1001) captured by an image capturing unit (for example, 11); and a control step (for example, S1103 to S1115) of controlling the autonomous work machine based on the past captured image specified by the specifying unit.

According to this embodiment, even when some or all of the markers arranged to define the work area are lost, the work can be continued because information of the past in which a marker has been previously arranged is used.

15. The operation method for the control device (for example, server) of the embodiments described above is an operation method for a control device that includes a storage unit (for example, 44c) that stores past captured images including one or more markers arranged to define a work area and controls a work machine that works in the work area, and the operation method includes:

an acquisition step of acquiring a current captured image captured by an image capturing unit;

a specifying step of specifying a past captured image stored in the storage unit and similar to the current captured image; and a control step of controlling the work machine based on the past captured image specified by the specifying step.

According to this embodiment, even when some or all of the markers arranged to define the work area are lost, the work can be continued because information of the past in which a marker has been previously arranged is used. Furthermore, the work of the work machine can be continued using an external control device such as a server that remotely controls the work machine.

16. The storage medium according to the embodiments described above is a non-transitory computer readable storage medium storing a program for causing a computer to function as the autonomous work machine according to the embodiments described above.

According to this embodiment, the autonomous work machine according to the present invention can be realized by a computer.

17. The storage medium according to the embodiments described above is a non-transitory computer readable storage medium storing a program for causing a computer to function as the control device according to the embodiments described above.

According to this embodiment, the control device according to the present invention can be realized by a computer.

According to the present invention, even when some or all of the markers arranged to define the work area are lost, the work can be continued.

The present invention is not limited to the above-described embodiments, and various changes and modifications can be made without departing from the spirit and scope of the present invention. Therefore, in order to make the scope of the present invention public, the following claims are attached.

What is claimed is:

1. An autonomous work machine that works in a work area, the autonomous work machine comprising:

at least one processor circuit with a memory;

a plurality of past captured images including one or more markers arranged to define the work area stored in the memory;

instructions that, when executed by the processor circuit, cause the at least one processor circuit to at least:

specify a past captured image of the past captured images stored in the memory and similar to a current captured image captured by an image capturing unit;

detect a marker in the current captured image and the specified past captured image; and determine whether the marker is missing in the current captured image with respect to the specified past captured image based on a detection result from the current captured image and a detection result from the specified past captured image similar to the current captured image, and when it is determined that the marker is missing, superimpose, on the current captured image and as a virtual marker, a corresponding marker in the specified past captured image, wherein the instructions, when executed by the processor circuit, further cause the at least one processor circuit to at least:

stop, move backward, or turn the autonomous work machine when a distance from the autonomous work machine to a virtual line connecting a plurality of markers detected from the current captured image becomes equal to or less than a first threshold, and stop, move backward, or turn the autonomous work machine when a distance from the autonomous work machine to a virtual line connecting a marker of the plurality of markers detected from the current captured image and the virtual marker is equal to or less than a second threshold larger than the first threshold.

2. The autonomous work machine according to claim 1, wherein the instructions, when executed by the processor circuit, further cause the at least one processor circuit to at least, in a case where a plurality of markers have been detected from the specified past captured image, set a virtual line connecting the plurality of markers, wherein the autonomous work machine is controlled such that the autonomous work machine does not deviate to a region beyond the virtual line set.

3. The autonomous work machine according to claim 2, wherein
a marker included in the specified past captured image and distance information from the autonomous work machine is stored in association with the marker, and
the virtual line is set based on distance information of each of the plurality of detected markers.

4. The autonomous work machine according to claim 2, wherein
the past captured image and another past captured image having parallax with respect to the past captured image are stored in the memory in association with each other, and
the instructions, when executed by the processor circuit, further cause the at least one processor circuit to at least,
calculate, based on the past captured image and the other past captured image having parallax with respect to the past captured image, distance information from the autonomous work machine to each of the plurality of detected markers, and
set the virtual line based on the calculated distance information.

5. The autonomous work machine according to claim 2, wherein
the past captured image and information of a position and orientation of the autonomous work machine at a time of capturing the past captured image are stored in the memory in association with each other, and
the instructions, when executed by the processor circuit, further cause the at least one processor circuit to at least, acquire the information on the position and orientation of the autonomous work machine corresponding to the specified past captured image; and acquire, based on the information on the position and orientation of the autonomous work machine and map information including an arrangement position of the marker, distance information to the detected marker from the specified past captured image, and when a plurality of markers have been detected, the virtual line is set based on the distance information acquired for each of the plurality of markers.

6. The autonomous work machine according to claim 1, wherein the instructions, when executed by the processor circuit, further cause the at least one processor circuit to at least control the autonomous work machine to stop, move backward, or turn in a case where a distance from the autonomous work machine to the virtual line becomes equal to or less than a threshold.

7. The autonomous work machine according to claim 1, wherein the instructions, when executed by the processor circuit, further cause the at least one processor circuit to at least:
update information stored in the memory; update the specified past captured image based on a captured image including the one or more markers captured by the image capturing unit.

8. The autonomous work machine according to claim 7, wherein the information of the specified past captured image is periodically updated.

9. The autonomous work machine according to claim 7, wherein the information of the specified past captured image is updated for each season or each month.

10. The autonomous work machine according to claim 7, wherein:
the instructions, when executed by the processor circuit, further cause the at least one processor circuit to at least: set a plurality of virtual line connecting markers,
set the virtual line based on distance information of each of a marker detected from the current captured image and the virtual marker superimposed and arranged on the current captured image, and
wherein the autonomous work machine is controlled so that the autonomous work machine does not deviate to a region beyond the set virtual line.

11. A control method for an autonomous work machine that works in a work area and includes a storage unit that stores past captured images including one or more markers arranged to define the work area, the control method comprising:
specifying a past captured image stored in the storage unit and similar to a current captured image captured by an image capturing unit;
detecting a marker in the current captured image and the specified past captured image;
determining whether the marker is missing in the current captured image with respect to the specified past captured image based on a detection result from the current captured image and a detection result from the specified past captured image similar to the current captured image,
when it is determined that the marker is missing, superimposing, on the current captured image and as a virtual marker, a corresponding marker in the specified past captured image,
stopping, moving backward, or turning the autonomous work machine when a distance from the autonomous work machine to a virtual line connecting a plurality of markers detected from the current captured image becomes equal to or less than a first threshold, and stopping, moving backward, or turning the autonomous work machine when a distance from the autonomous work machine to a virtual line connecting a marker of the plurality of markers detected from the current captured image and the virtual marker is equal to or less than a second threshold larger than the first threshold.

12. A non-transitory computer readable storage medium storing a program for causing a computer to execute a control method for an autonomous work machine that works in a work area and includes a storage unit that stores past captured images including one or more markers arranged to define the work area, the control method comprising:

specifying a past captured image stored in the storage unit and similar to a current captured image captured by an image capturing unit;

detecting a marker in the current captured image and the specified past captured image;

determining whether the marker is missing in the current captured image with respect to the specified past captured image based on a detection result from the current captured image and a detection result from the specified past captured image similar to the current captured image, when it is determined that the marker is missing, superimposing, on the current captured image and as a virtual marker, a corresponding marker in the specified past captured image, stopping, moving backward, or turning the autonomous work machine when a distance from the autonomous work machine to a virtual line connecting a plurality of markers detected from the current captured image becomes equal to or less than a first threshold, and stopping, moving backward, or turning the autonomous work machine when a distance from the autonomous work machine to a virtual line connecting a marker of the plurality of markers detected from the current captured image and the virtual marker is equal to or less than a second threshold larger than the first threshold.

* * * * *